US011606406B1

(12) United States Patent
Agrawal et al.

(10) Patent No.: US 11,606,406 B1
(45) Date of Patent: Mar. 14, 2023

(54) ELECTRONIC DEVICE THAT MITIGATES AUDIO/VIDEO COMMUNICATION DEGRADATION OF AN IMAGE STREAM OF A LOCAL PARTICIPANT IN A VIDEO COMMUNICATION SESSION

(71) Applicant: MOTOROLA MOBILITY LLC, Wilmington, DE (US)

(72) Inventors: Amit Kumar Agrawal, Bangalore (IN); Rahul B. Desai, Naperville, IL (US); Alexandre Novaes Olivieri, Campinas (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/410,615

(22) Filed: Aug. 24, 2021

(51) Int. Cl.
*H04L 65/75* (2022.01)
*G08B 5/22* (2006.01)
*H04L 43/16* (2022.01)
*G10L 15/26* (2006.01)

(52) U.S. Cl.
CPC ............. *H04L 65/75* (2022.05); *G08B 5/22* (2013.01); *G10L 15/26* (2013.01); *H04L 43/16* (2013.01)

(58) Field of Classification Search
CPC ........ H04L 65/75; H04L 43/16; G10L 15/26; G08B 5/22
USPC ........................................... 348/14.02–14.09
See application file for complete search history.

(56) References Cited

U.S. PATENT DOCUMENTS

| 9,445,051 | B1 | 9/2016 | Kantharaju et al. |
|---|---|---|---|
| 10,999,346 | B1 | 5/2021 | Yang |
| 11,095,851 | B2 | 8/2021 | Lee et al. |
| 2003/0007458 | A1* | 1/2003 | Procopio ................. H04L 65/80 370/252 |
| 2003/0202112 | A1 | 10/2003 | Bowman et al. |
| 2005/0105471 | A1 | 5/2005 | Ido et al. |
| 2006/0109786 | A1 | 5/2006 | Abdel-Kader et al. |
| 2009/0089849 | A1* | 4/2009 | Jefremov ........... H04N 21/4436 725/118 |
| 2009/0190652 | A1 | 7/2009 | Kim |
| 2011/0222466 | A1* | 9/2011 | Pance .................. H04Q 3/0029 370/316 |

(Continued)

FOREIGN PATENT DOCUMENTS

CA 3045125 C 7/2020
WO 2007117613 A3 6/2008

*Primary Examiner* — Maria El-Zoobi
(74) *Attorney, Agent, or Firm* — Isidore PLLC

(57) ABSTRACT

An electronic device, computer program product, and method are provided that autonomously mitigates degraded transmissions of an audio/image stream from an electronic device to a video communication session. The electronic device communicates at least one of an image stream and an audio stream to other second electronic device(s). In response to receiving an indication that the at least one of the image stream and the audio stream is degraded, a controller presents a transmission quality degraded report using at least one display device to prompt mitigation. The controller can configure the electronic device to mitigate the degraded at least one of the image stream and the audio stream by altering the at least one of the image stream and the audio stream to support transmission via a lower data rate. The electronic device communicates the altered at least one of the image stream and the audio stream to the session.

20 Claims, 14 Drawing Sheets

(56) References Cited

U.S. PATENT DOCUMENTS

| | | |
|---|---|---|
| 2012/0260296 A1 | 10/2012 | Mallet et al. |
| 2012/0281589 A1 | 11/2012 | Ozawa |
| 2013/0058221 A1 | 3/2013 | Andersen et al. |
| 2013/0290492 A1 | 10/2013 | ElArabawy et al. |
| 2015/0095704 A1 | 4/2015 | Sokolik et al. |
| 2015/0256796 A1 | 9/2015 | Ma |
| 2016/0127710 A1 | 5/2016 | Saban et al. |
| 2017/0104816 A1 | 4/2017 | Yan |
| 2019/0158786 A1 | 5/2019 | Yasuda |
| 2020/0351747 A1 | 11/2020 | Verger et al. |
| 2021/0067743 A1 | 3/2021 | Hodge et al. |
| 2021/0099579 A1 | 4/2021 | Vuppaladhadiam |
| 2021/0105436 A1 | 4/2021 | Lee et al. |
| 2021/0250195 A1 | 8/2021 | Baker |
| 2022/0070243 A1 | 3/2022 | Hartnett et al. |
| 2022/0070504 A1 | 3/2022 | Hartnett et al. |
| 2022/0239720 A1 | 7/2022 | Madanapalli et al. |

\* cited by examiner

ELECTRONIC DEVICE THAT MITIGATES AUDIO/VIDEO COMMUNICATION DEGRADATION OF AN IMAGE STREAM OF A LOCAL PARTICIPANT IN A VIDEO COMMUNICATION SESSION

BACKGROUND

1. Technical Field

The present disclosure relates generally to electronic devices having a microphone and a camera, and more particularly to electronic devices that communicate audio and video respectively from the microphone and camera to a video communication session.

2. Description of the Related Art

User electronic devices such as mobile phones, desktop workstations, laptops, and tablets are often equipped with a front side camera and a microphone to enable online human communication. Microphones and cameras can also be incorporated as peripheral devices. So as to simulate an in-person conversation, meeting, or lecture, each participant in a video communication session generally positions themself within the field of view of the local camera and within detection range of the microphone. The respective image stream and audio stream are communicated to the video communication session for presentation by one or more second electronic devices. Recent trends are for increased use of video communications in a wide range of settings including homes and public spaces. Unlike a one-way broadcast, video communication session can include exchanges of audio, video, and data from each communication device to the other communication devices.

Unlike dedicated conference rooms having business-grade wireless and wired networks, many participants use electronics devices in a wide variety of venues. In particular, many participants connect to the video communication session in these venues using over-the air (OTA) networks such as a radio access network (RAN) or a wireless access networks (WAN). OTA networks can be unreliable when the communication device is in a marginal coverage area due to distance, interference, or when competing with other communication devices for limited communication resources. Video communication sessions require low data latency in order to experience this exchange of audio, video, and data without degrading the user experience. In particular, communication devices in a marginal coverage area can experience degradation on a transmit uplink that is more degraded than a receive downlink. As an example, the RAN can have a better capacity to transmit to a user communication device than the capacity of the user communication device to transmit to the RAN. A participant using the communication device in the marginal coverage area may be unaware of the degraded transmit uplink. Degraded audio and video presented on other communication devices affects the user experience of the other participants and reduces the efficacy of the video communication session. Conventionally, other participants have to inform the participant whose communication device is providing the degraded transmit uplink about the degraded transmit uplink. These verbal exchanges between participants further interrupt the video communication session.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
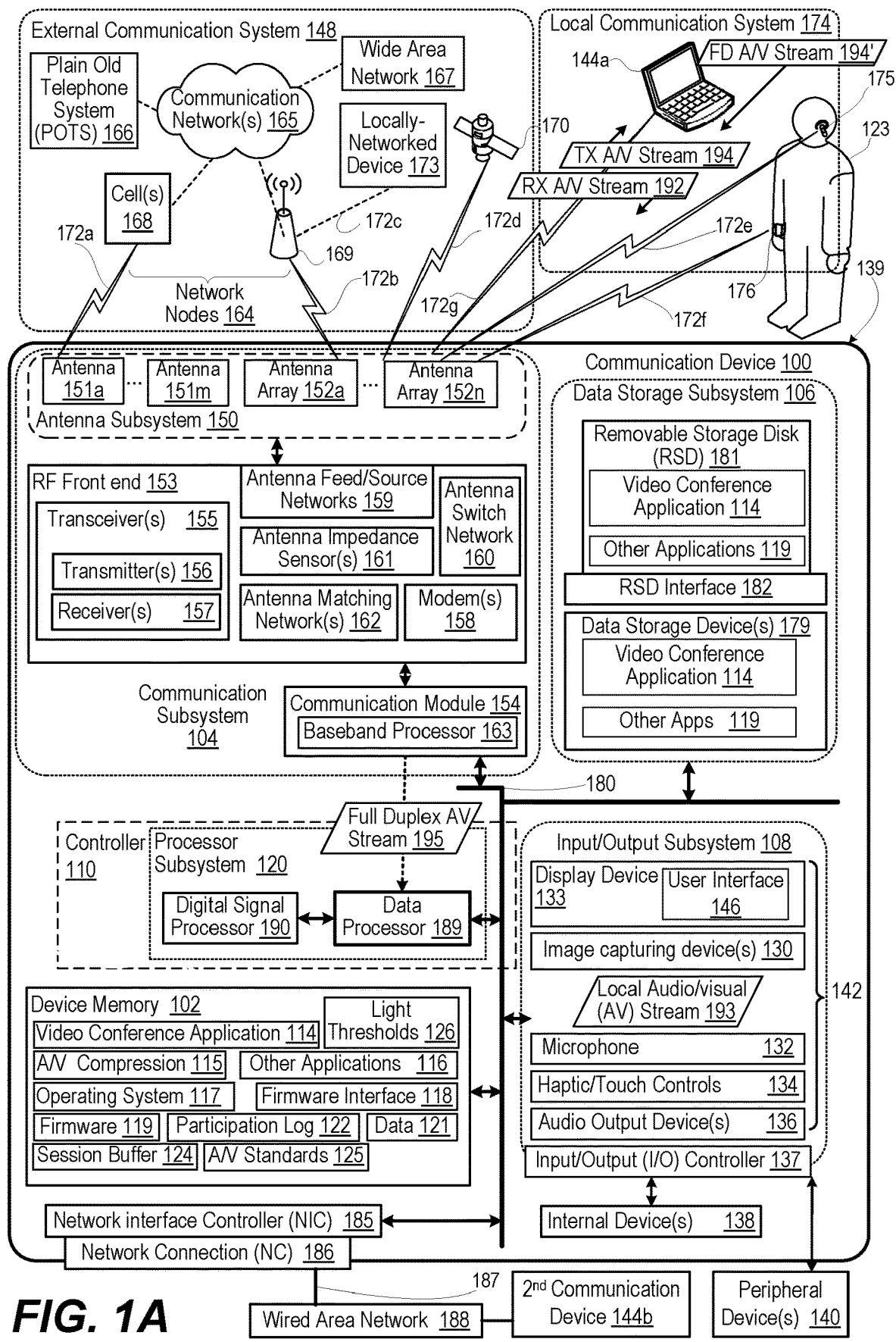
FIG. 1A depicts a functional block diagram of a communication environment including a communication device having components that respond to a communication interruption or degradation during a video communication session, and within which the features of the present disclosure are advantageously implemented, according to one or more embodiments.

According to a first aspect of the present disclosure, an electronic device, a computer program product, and a method are provided that autonomously mitigates degradation of audio/video communication originating from the electronic device used by a local participant in a video communication session. The electronic device includes one or more sensors from among: (i) at least one image capturing device that captures and provides a first image stream; and at least one microphone that captures and provides a first audio stream. The electronic device includes at least one of a display device and an audio output device operating as a user interface device. The electronic device includes at least one network interface that communicatively connects the electronic device to the at least one second electronic device via a video communication session. A controller of the electronic device is communicatively coupled to the one or more sensors, the user interface device, and the at least one network interface. The controller controls the electronic device to communicate a first transmission comprising one or more of the first audio stream and the first image stream to the video communication session. In response to receiving an indication that one or more of the first image stream and the first audio stream within the first transmission is degraded, the controller controls the electronic device to perform at least one of (i) presenting a transmission quality degraded (TQD) report at the at least one display device; and (ii) mitigating the degradation of the first transmission. The mitigation includes altering a corresponding one or more of the first image stream and the first audio stream to support transmission via a lower data rate; and communicating the altered one or more of the first image stream and the first audio stream to the video communication session.

According to a second aspect of the present disclosure, an electronic device, a computer program product, and a method are provided that autonomously mitigates degradation of audio/video communication originating from a second electronic device used by a remote participant in a video communication session. The electronic device includes at least one network interface that communicatively connects the electronic device to one or more second electronic devices during a video communication session. A controller of the electronic device is communicatively coupled to the at least one network interface. The controller controls the electronic device to receive at least one of an audio stream and an image stream provided by at least one transmitting device of the one or more second electronic devices during the video communication session. The controller controls the electronic device to communicate the at least one of the audio stream and the image stream from the at least one transmitting device to other ones of the one or more second electronic devices. The controller determines when at least one of the audio and the image stream from a particular one of the second electronic device is in a degraded state. In response to determining that at least one of the audio and the image stream received from the particular one of the at least one transmitting devices is in a degraded state, the controller controls the electronic device to alert the particular one of the one or more second electronic devices of the degraded state of the transmission.

According to a third aspect of the present disclosure, an electronic device, a computer program product, and a method are provided that support individualized dynamic playback of a live video communication session. The electronic device includes at least one network interface that communicatively connects the electronic device to one or more second electronic devices during a communication session. A controller of the electronic device is communicatively coupled to the at least one network interface. The controller controls the electronic device to receive at least one of an audio stream and an image stream provided by at least one transmitting device from among the one or more second electronic devices during the video communication session. The controller controls the electronic device to communicate the at least one of the audio stream and the image stream from the at least one transmitting device to other devices among the one or more second electronic devices. The controller buffers the communication session in a dynamically accessible format. In response to receipt of a trigger during the communication session, the controller controls the electronic device to communicate a length of the buffered communication session to a particular one of the one or more second electronic devices.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1A depicts a functional block diagram of an electronic device, specifically communication device 100, within an operating environment and within which several of the features of the present disclosure are advantageously implemented. Referring now to the specific component makeup and the associated functionality of communication device 100 of FIG. 1A. In one or more embodiments, communication device 100 has device memory 102, communication subsystem 104, data storage subsystem 106, and input/output (I/O) subsystem 108. Device memory 102 and each subsystem (104, 106, and 108) are managed by controller 110. Device memory 102 includes program code for applications, such as video conference application 114, audio/video compression application 115, and other application(s) 116. Device memory 102 further includes operating system (OS) 117, firmware interface 118, such as basic input/output system (BIOS) or Uniform Extensible Firmware Interface (UEFI), and firmware 119.

Controller 110 includes processor subsystem 120 that executes program code to provide operating functionality of communication device 100. The software and/or firmware modules have varying functionality when their corresponding program code is executed by processor subsystem 120 or secondary processing devices within communication device 100. Processor subsystem 120 of controller 110 can execute program code of video conference application 114, audio/video compression application 115, and other applications 116 to configure communication device 100 to perform specific functions. Device memory 102 can include data 121 used by the applications. As an example of data 121 and associated usage, participation log 122 can be used by video conference application 114 to track communication status of participants 123 associated with a video communication session. As an additional example, session buffer data 124 can be used by video conference application 114 for buffering presentation content of a video communication session for individualized, customized dynamic playback. As an additional example, audio/video standards 125 can define characteristics against which audio/video streams can be compared by video conference application 114 to detect degrees of degradation. In one or more embodiments, one or more thresholds are defined by audio/video standards 125 that correspond to degradation(s) sufficient to cause a distraction to participant 123, reducing a user experience in participating in a video communication session. As yet an additional example, light threshold data 126 can be used by video conference application 114 to determine whether ambient light levels are sufficient in an image stream produced by image capturing device 130.

I/O subsystem 108 includes user interface components such as image capturing device 130, microphone 132, display device 133, touch/haptic controls 134, and audio output device(s) 136. I/O subsystem 108 also includes I/O controller 137. I/O controller 137 connects to internal devices 138, which are internal to housing 139, and to peripheral devices 140, such as external speakers, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices 140 and other components of communication device 100 that use a different configuration for inputs and outputs.

Communication device 100 is managed by controller 110, which is communicatively coupled to image capturing device 130 and to at least one user interface device 142, such as at least one microphone 132. Image capturing device 130 and user interface device 142 allows a participant using communication device 100 to be an active participant in a video communication session with a second participant using a second communication device 144. Controller 110 is also communicatively coupled to at least one display device 133 that presents user interface 146 for the video communication session. Controller 110 executes video conference application 114 stored in device memory 102 to configure communication device 100 to enable communication with second communication device 144a/144b in the video communication session. It is appreciated that second communication device 144a/144b can be similarly configured and/or provide similar functionality as communication device 100.

Each of communication device 100 and second communication devices 144a-144b can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 detected by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceivers 155. Antenna matching network(s) 162 can also be used to detune the impedance of lower band antennas 151a-151m to not match the impedance of transceivers 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 151a-151m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node 169. In one or more particular embodiments, access node 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node 169. Communication subsystem 104 receives downlink broadcast channel(s) 172d from GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with headset 175. Communication subsystem 104 communicates via second low power wireless communication channel(s) 172f, such as Bluetooth, with smart watch 176. In one or more particular embodiments, communication subsystem 104 communicates with second communication device(s) 144a via wireless link 172g to form an ad hoc network.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as video conference application 114 and other application(s) 119 that use communication services. These applications can be loaded into device memory 102 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for video conference application 114 and other applications 116.

In one aspect of the present disclosure, communication device 100 is used by participant 123 to participate in a video communication session as a "receiving device". When executed by controller 110, the program code causes or configures communication device 100 to: (i) receive audio stream and/or video stream from "transmitting" second communication device 144a; (ii) present the audio stream and/or video stream on user interface device 142 of communication device; and (iii) determine that the audio stream and/or image stream are degraded; and (iv) report the degraded audio stream and/or image stream to "transmitting" communication device 144a. Controller 110 can determine that the audio stream and/or image stream are degraded based on autonomously analyzing the audio stream and/or image stream against audio/video standards 125. Controller 110 can determine that the audio stream and/or image stream are degraded based on user input to user interface device 142 by participant 123. Controller 110 can determine that the audio stream and/or image stream are degraded based on receiving a report from another "receiving" communication device 144b.

In one or more different embodiments, communication device 100 operates autonomously such as like a network server to facilitate a video communication session. When executed by controller 110, the program code causes or configures communication device 100 to: (i) receive audio stream and/or video stream from "transmitting" second communication device 144a; (ii) distribute the audio stream and/or video stream from "transmitting" second communication device 144a to other "receiving" communication device(s) 144b; (iii) determine that the audio stream and/or image stream are degraded; and (iv) report the degraded audio stream and/or image stream to "transmitting" communication device 144a. Controller 110 can determine that the audio stream and/or image stream are degraded based on autonomously analyzing the audio stream and/or image stream against audio/video standards 125. Controller 110 can determine that the audio stream and/or image stream are degraded based on receiving a report from another "receiving" communication device 144b.

In another aspect of the disclosure, communication device 100 is used by participant 123 to participate in a video communication session as the "transmitting device". When executed by controller 110, the program code causes or configures communication device 100 to: (i) transmit audio stream and/or video stream to at least one of second communication device 144a-144b; (ii) receive a report of the degraded audio stream and/or image stream from one of "receiving" communication devices 144a-144b; and (iii) perform a mitigation such as presenting an alert on user interface device 142, turning off image capturing device 130, or compressing audio stream and/or image stream to reduce data transmission rates.

In a third aspect of the disclosure, communication device 100 can facilitate the video communication system as a "host or network device". When executed by controller 110, the program code causes or configures communication device 100 to: (i) dynamically buffer the video communication session; and (ii) communicate a length of the buffered data to second communication device 144a-144b. Similarly, communication device 100 can be the "receiving device". When executed by controller 110, the program code causes or configures communication device 100 to receive the length of the buffered data. In either role, communication device 100 enables a participant to replay a length of the buffered video communication session to catch up with an on-going video communication session after an interruption or after joining late.

In one or more embodiments, I/O subsystem 108 includes network interface controller (NIC) 185 with a network connection (NC) 186 on housing 139. Network cable 187 connects NC 186 to wired area network 188. Wired area network 188 can be a local area network (LAN), a campus area network (CAN), a metropolitan area network (MAN), or a wide area network (WAN). For example, NC 186 can be an Ethernet connection. Second communication devices 144b is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 120, which includes one or more central processing units (CPUs), depicted as data processor 189. Processor subsystem 120 can include one or more digital signal processors 190 that are integrated with data processor 189 or are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 102. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 180) are illustrated in FIG. 1A, it is to be understood that more, fewer, or different interconnections may be present in other embodiments.

Communication device 100 can support a video communication session with second communication devices 144a-144b. In one or more embodiments, communication device 100 can provide autonomous network services to second communication devices 144a-144b that are used by respective participants 123. Communication device 100 can receive and present receive (RX) audio/video streams 192 from communication devices 144a-144b. In one or more embodiments, controller 110 determines that an RX audio/video stream 192 is degraded and responds by notifying the corresponding one of communication devices 144a-144b.

In one or more embodiments, to better facilitate the video communication session, communication device 100 dynamically buffers an ongoing video communication session and distributes certain lengths of the buffered video communication to second communication devices 144a-144b that did not receive a portion of the video communication session or where the corresponding participant 123 chooses/selects to replay the portion of the video communication session. In one or more embodiments, communication device 100 receives and presents a length of buffered video communication for playback for the corresponding participant 123.

In one or more embodiments, communication device 100 is used by participant 123 to experience and participate in the video communication session. Communication device 100 can receive and present RX audio/video streams 192. In one or more embodiments, controller 110 determines that an RX audio/video stream 192 is degraded and responds by notifying either communication device 100*a* (FIG. 1B) that is facilitating the video communication session or directly notifying the corresponding one of communication devices 144*a*-144*b*. Controller 110 can autonomously determine the degradation of a particular RX audio/video stream 192 or be prompted by a user input from participant 123 via user interface device 142.

When communication device 100 is participating in video communication session, image capturing device(s) 130 and microphone 132 can produce local audio/video stream 193 that is communicated as transmit (TX) audio/video stream 194 by communication subsystem 104 to second communication devices 144*a*-144*b*. In one or more embodiments, second communication device 144*a* may communicate full duplex (FD) audio/video stream 194' to communication device 100. TX audio/video stream 194 is received by second communication device 144*a* as FD audio/video stream 194'. Controller 110 may autonomously determine that received FD audio/video stream 194' is degraded. As an example, controller 110 can compare FD audio/video stream 194' to TX audio/video stream 194 to determine whether the amount of degradation is greater than a threshold amount. Controller 110 may present FD audio/video stream 194' via user interface device 142, allowing local participant 123 to identify the degradation and to respond with mitigating techniques. Controller 110 can autonomously initiate mitigation, or respond to a local participant's inputs for mitigation, of degraded transmission by performing mitigating operations, such as by turning off image capturing device(s) 130, compressing TX audio/video stream 194 to remain within available communication channel capabilities, or prompting for an improvement to the available communication channel capabilities.

Figure 1B:
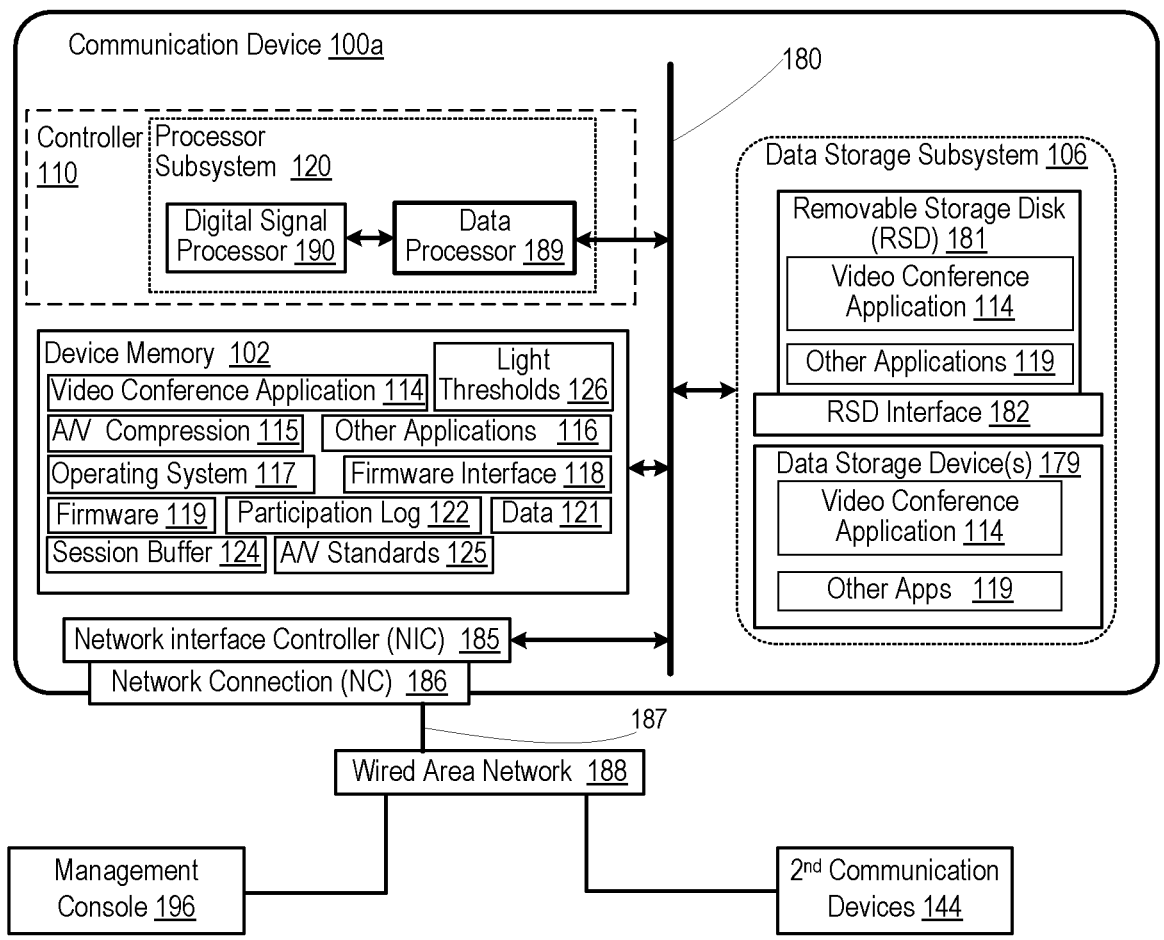
FIG. 1B depicts a functional block diagram of a communication environment including another communication device having network server components that respond to a communication interruption or degradation during a video communication session, and within which the features of the present disclosure are advantageously implemented, according to one or more embodiments.

FIG. 1B depicts a functional block diagram of a communication environment including communication device 100*a* having network server components that respond to a communication interruption or degradation during a video communication session, and within which the features of the present disclosure are advantageously implemented. In one or more embodiments, communication device 100*a* can have similar or identical components to communication device 100 with certain components unused or removed to enable communication device 100*a* to function as a network server. In one or more embodiment, communication device 100*a* is purpose assembled as a network server having controller 110 that manages device memory 102, data storage subsystem 106, and NIC 185. Management console 196 can periodically communicatively connect to communication device 100*a* via wired area network 188 to configure program code such as video conference application 114 and data 121. Controller 110 executes video conference application 114 to configure communication device 100*a* to facilitate one or more communication sessions for second communication devices 144.

Figure 5:
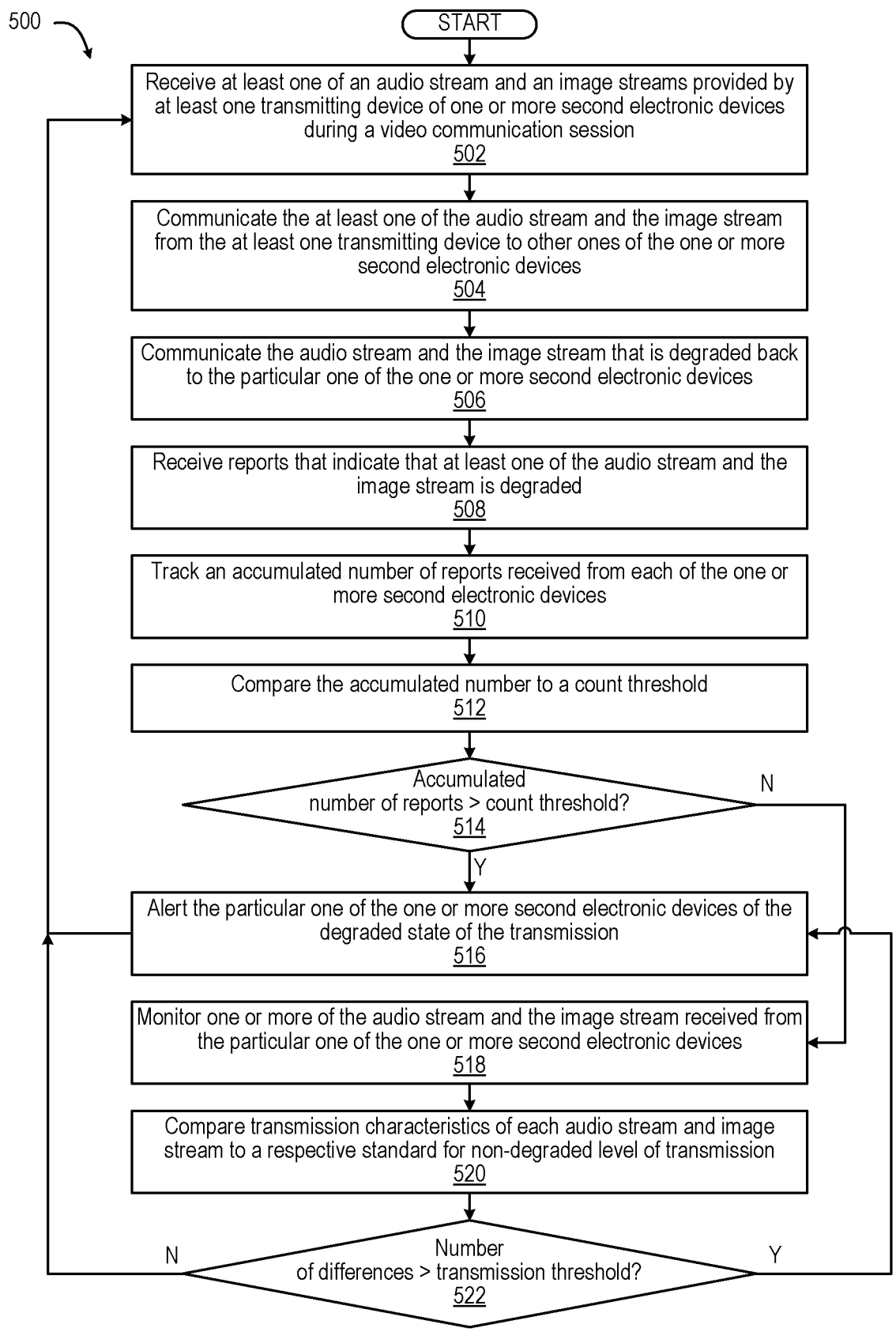
FIG. 5 presents a flow diagram of a method for responding to a second communication device that is transmitting degraded audio, video, or data in a video communication session, according to one or more embodiments.
Figure 6:
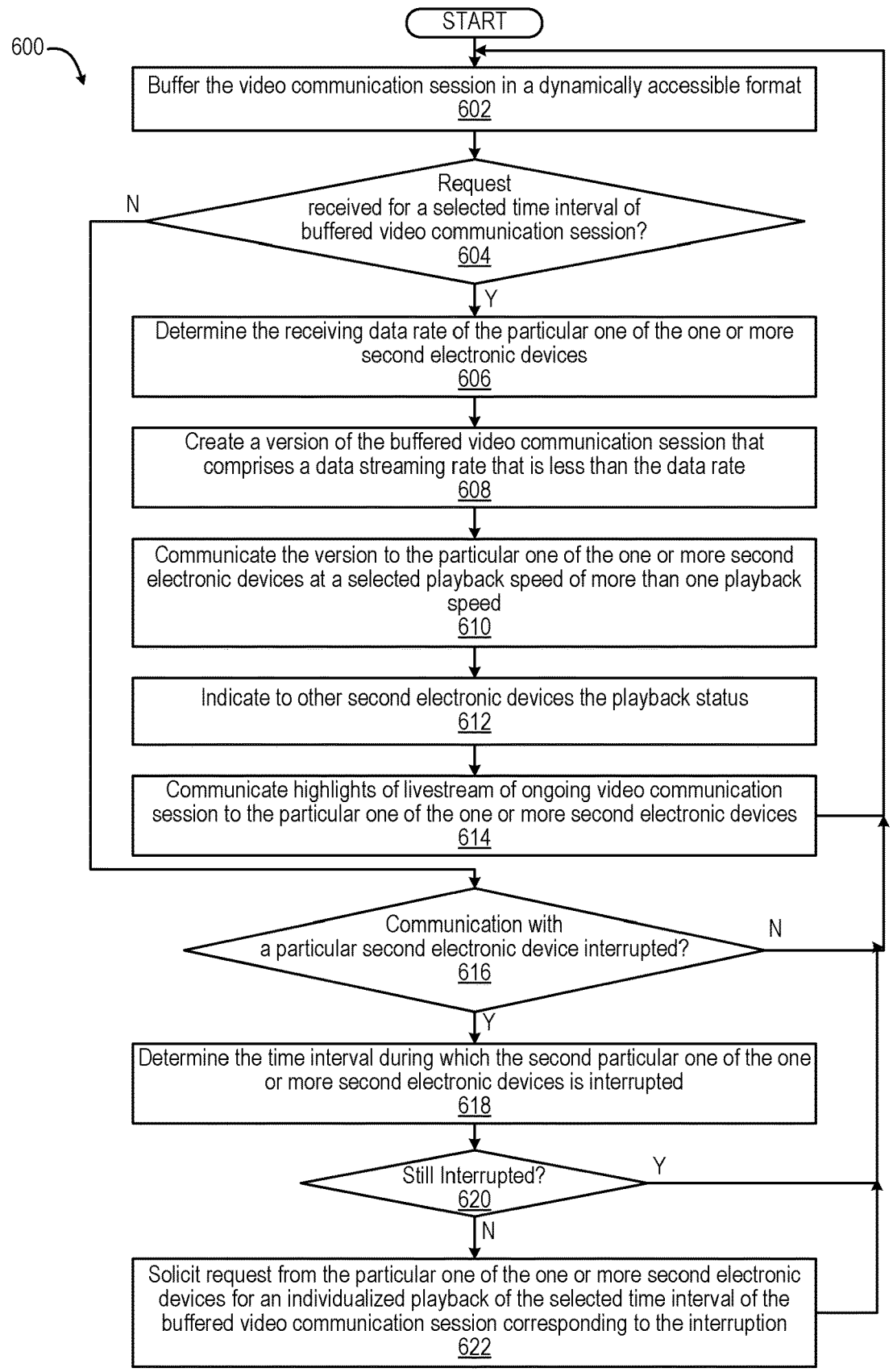
FIG. 6 presents a flow diagram of a method for distributing buffered content from an ongoing video communication session to a receiving device to enable device replay of prior live content, according to one or more embodiments.

Degradation of a transmission from a "transmitting" device to a "receiving" device can occur at various points in a communication network. In certain instances, the degradation is symmetric with the same "transmitting" device also receiving degradation of received signals when acting as a "receiving" device." This particular device can be a marginal over-the-air coverage area or be connected via a malfunctioning network. The two-way communication degradation provides an indication to the particular device and a user of the particular device that there is a communication problem, enabling a unilateral response. Aspects of the present disclosure can mitigate the two-way communication degradation scenario. However, the present disclosure particularly addresses the scenario of asymmetric communication degradation as described below with regard to FIGS. 2-4. The "transmitting" device that communicates a degraded transmission is not necessarily aware of the communication problem. FIGS. 5-6 present mitigations performed by one or more "receiving" devices in response to receiving a degraded transmission. FIGS. 7 and 8A-8C present mitigations performed by the "transmitting" device once alerted to the communication problem.

Figure 2:
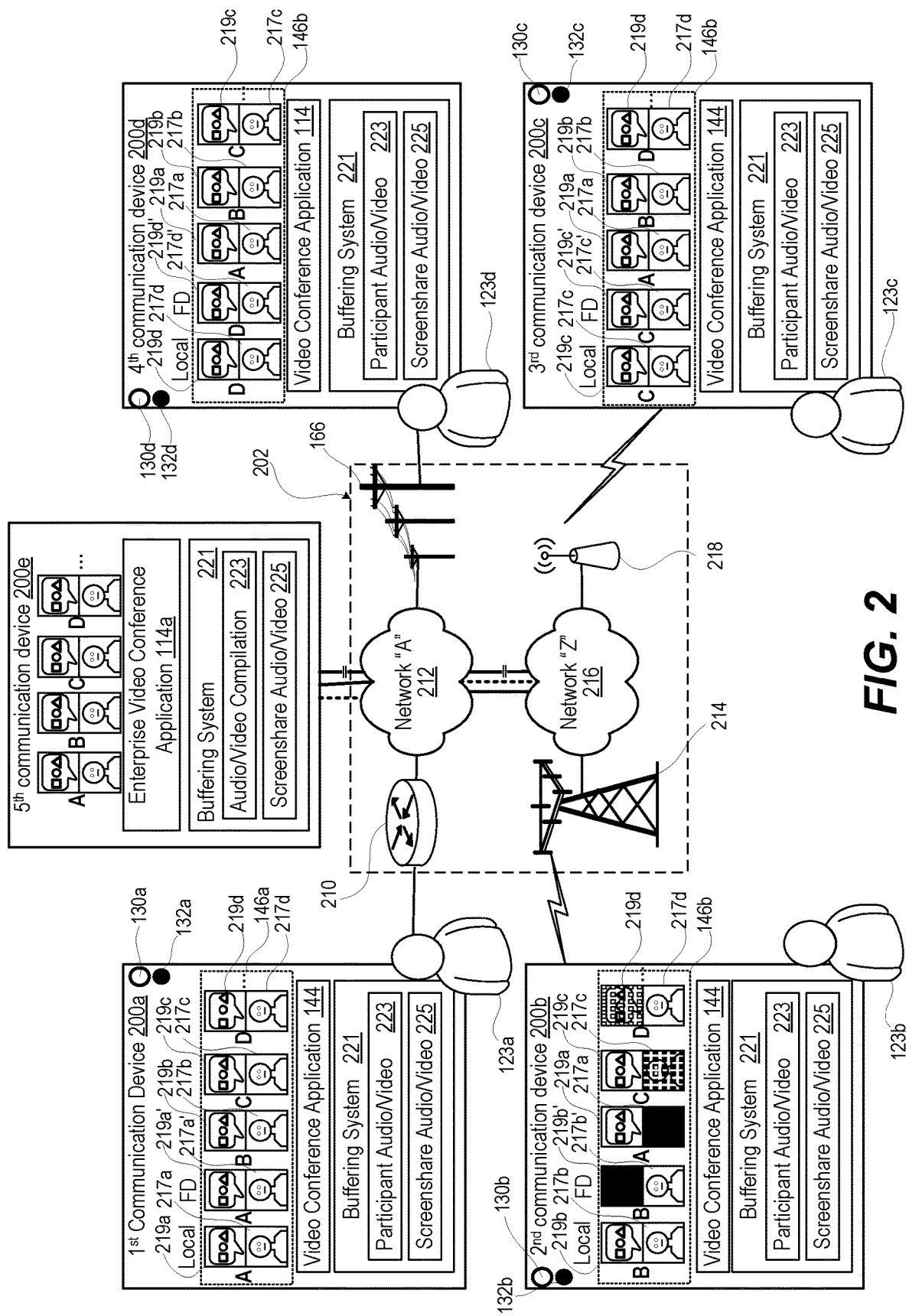
FIG. 2 depicts respective user interfaces of first, second, and third communication devices participating in a video communication session, according to one or more embodiments.

FIG. 2 depicts a communication network environment in which host and participant communication devices 200*a*-200*d* are receiving and autonomously responding to degraded audio/video transmission within the video communication session. Host and participant communication devices 200*a*-200*d* are respectively used by participants 123*a*-123*d*. Fifth communication device 200*e* is a network server that executes enterprise video conference application 114*a* to support the video communication session. Each of communication devices 200*a*-200*d* can be an implementation of communication device 100 (FIG. 1A) and communication device 200*e* can be an implementation of communication device 100*a* (FIG. 1B), having similar or identical components. Each of communication devices 200*a*-200*e* can perform aspects of the present innovation and functionality as described herein. Network 202 has additional complexity such that different communication devices 200*a*-200*e* can experience different types of interruptions. In an example, communication device 200*a* connects through network router 210 to network "A" 212, such as provided by a first carrier. Communication device 200*b* connects through radio access network (RAN) 214 to network "Z" 216, such as provided by a second carrier. Networks 212 and 216 are communicatively interconnected. Communication device 200*c* connects through wireless access point 218 to network "Z" 216. Communication device 200*d* connects through POTS 166 to network "A" 212.

User interface 146*a* of communication device 200*a* presents local image stream 217*a* from local image capturing device 130*a* and local audio stream 219*a* from local microphone 132*a*. User interface 146*a* of communication device 200*a* presents full duplex image stream 217*a*' and full duplex audio stream 219*a*' returned from one of communication devices 200*b*-200*e*. User interface 146*a* of communication device 200*a* presents image stream 217*b* and audio stream 219*b* originating from communication device 200*b*. User interface 146*a* of communication device 200*a* presents image stream 217*c* and audio stream 219*c* originating from communication device 200*c*. User interface 146*a* of communication device 200*a* presents image stream 217*d* and audio stream 219*d* originating from communication device 200*d*.

User interface 146*b* of communication device 200*b* presents local image stream 217*b* from local image capturing device 130*b* and local audio stream 219*b* from local microphone 132*b*. User interface 146*b* of communication device 200*b* presents full duplex image stream 217*b*' and full duplex audio stream 219*b*' returned from one of communication devices 200*a* and 200*c*-200*e*. User interface 146*b* of communication device 200*b* presents image stream 217*a* and audio stream 219*a* originating from communication device 200*a*. User interface 146*b* of communication device 200*b* presents image stream 217*c* and audio stream 219*c* originating from communication device 200*c*. User interface 146*a* of communication device 200*a* presents image stream 217*d* and audio stream 219*d* originating from communication device 200*d*.

User interface 146c of communication device 200c presents local image stream 217c from local image capturing device 130c and local audio stream 219c from local microphone 132c. User interface 146c of communication device 200c presents full duplex image stream 217c' and full duplex audio stream 219c' returned from one of communication devices 200a-200b and 200d-200e. User interface 146c of communication device 200c presents image stream 217a and audio stream 219a originating from communication device 200a. User interface 146c of communication device 200c presents image stream 217b and audio stream 219b originating from communication device 200b. User interface 146c of communication device 200c presents image stream 217d and audio stream 219d originating from communication device 200d.

User interface 146d of communication device 200d presents local image stream 217d from local image capturing device 130d and local audio stream 219d from local microphone 132d. User interface 146d of communication device 200d presents full duplex image stream 217d' and full duplex audio stream 219d' returned from one of communication devices 200a-200c and 200e. User interface 146d of communication device 200d presents image stream 217a and audio stream 219a originating from communication device 200a. User interface 146d of communication device 200d presents image stream 217b and audio stream 219b originating from communication device 200b. User interface 146d of communication device 200d presents image stream 217c and audio stream 219c originating from communication device 200c. Fifth communication device 200e can act as central repository and distributor of the image streams 217a-217d and audio streams 219a-219d.

Although only four participants 123a-123d are presented, a larger (or smaller) number of communication devices can be connected to the video communication session. Degradations to content distributed in the video communication session can occur in multiple places, including at host, participant, and network communication devices 200a-200e. Degradation can occur in one or more links in a communication path between devices participating in the video communication session. Data throughput constraints can create data latency issues. Interference or noise can exceed the ability of error encoding. Equipment can malfunction. One or more of host, participant, and network communication devices 200a-200e can receive and autonomously respond to degraded audio/visual transmissions from other ones of host, participant, and network communication devices 200a-200e. In one or more embodiments, communication devices 200a-200d, each executing video conference application 114, can autonomously determine whether received video conference content is degraded. In one or more embodiments, each of participants 123a-123d can individually determine whether received video conference content is degraded. Reports of degraded content can be tracked and aggregated, such as by fifth communication device 200e. When enough reports are received within a threshold period of time, fifth communication device 200e can notify the originating communication device from among communication devices 200a-200d. In one or more embodiments, any of communication devices 200a-200e can report directly to other communication devices 200a-200e when degradation is detected or determined. Responsibilities for buffering and sharing of content for the video communication session can be distributed. In an example, each communication device includes buffering system 221 that captures participant audio/video 223 and screenshare audio/video 225.

User interface 146b of second communication device 200b provides an example of different types of degradation that can be determined. Self-image stream 217b and self-audio stream 219b are presented as being good (not degraded) as is full duplex image stream 217b'. Full duplex audio stream 219b' is presented with an indication of off/disconnected. Image stream 217a is depicted as "off", while audio stream 219a is depicted as "on" for first communication device 200a. Image stream 217c is depicted as degraded, while audio stream 219c is depicted as "on" for third communication device 200c. Image stream 217d is depicted as good, while audio stream 219d is depicted as degraded for fourth communication device 200d. The presented indications of degraded transmissions can prompt autonomous mitigations by corresponding communication device(s) 200a-200e and/or manual mitigations by corresponding participant(s) 123a-123d.

Figure 3:
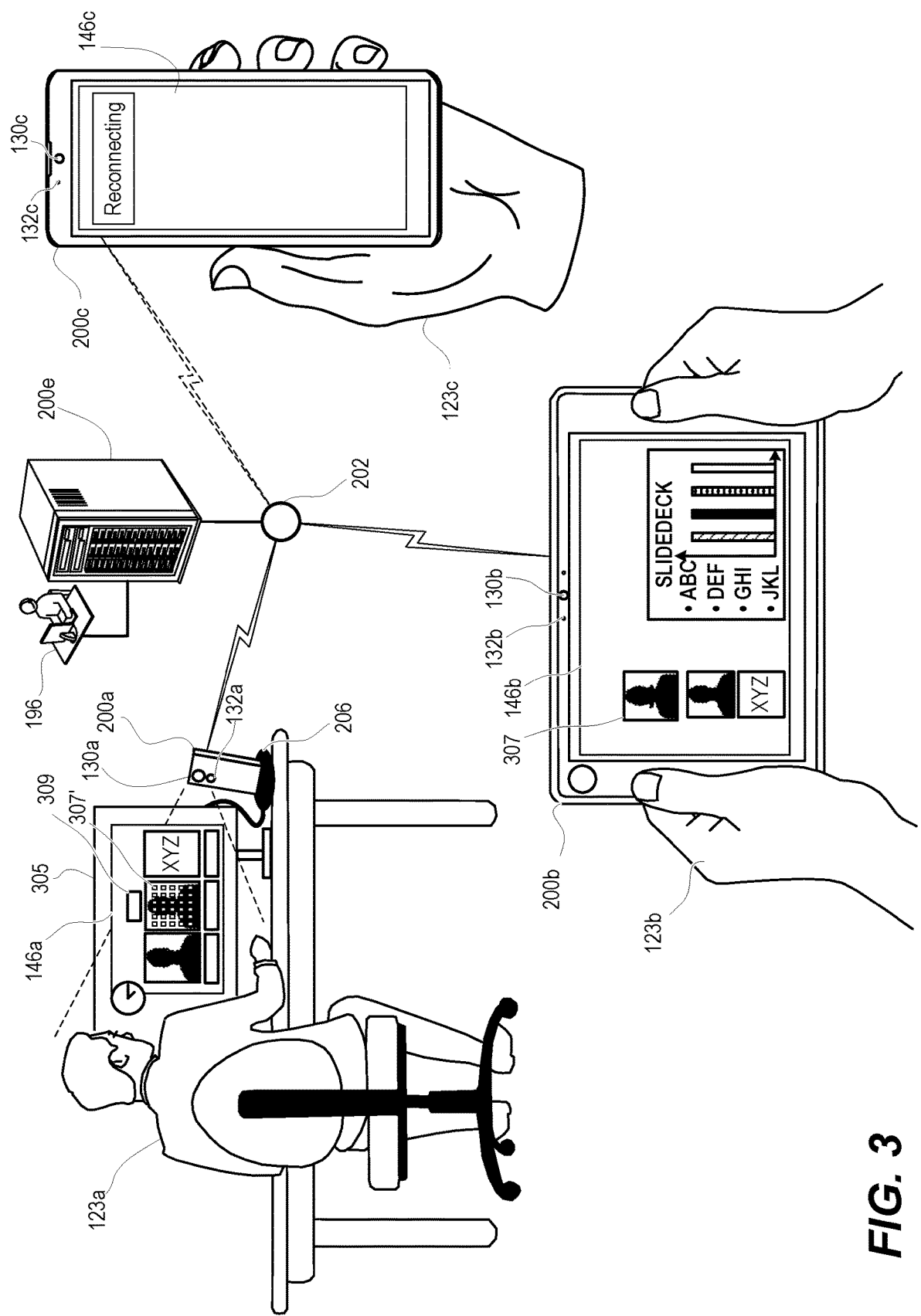
FIG. 3 depicts a subsequent view of the respective user interfaces of the first, second, and third communication devices participating in the video communication session, according to one or more embodiments.

FIG. 3 depicts respective user interfaces 146a-146b of first, second, and third communication devices 200a-200c participating in a video communication session. Fourth communication device 200d autonomously supports the video communication session. Fourth communication device 200d can be an implementation of communication device 100a of FIG. 1A. For clarity, all four communication devices 200a-200d are depicted connected via a single network node 202. Each of communication devices 200a-200d can be an implementation of communication device 100 (FIG. 1A), having similar or identical components. Each of communication devices 200a-200d can perform aspects of the present innovation and functionality as described herein. In an example, communication device 200a can provide host functions used by participant 123a such as enabling certain participants 123a-123c to contribute audio, video, and data to the video communication session, while preventing others from contributing. Participant 123a views user interface 146a presented on external display device 305. In one or more embodiments, external display device 305 is a monitor, a laptop screen, a desktop workstation, or a tablet computer. Communication device 200a, which can be a smart phone, includes front image capturing device 130a, which has a field of view that incorporates participant 123a. Communication device 200a includes microphone 132a that can detect speech by participant 123a. In one or more embodiments, communication device 200a is received in dock 306 that maintains positioning of image capturing device 130a. In one or more embodiments, dock 306 can provide power to communication device 200a. In one or more embodiments, dock 306 can present a communication link to enable communication device 200a to be communicatively coupled to external display device 305.

According to a first aspect of the disclosure, communication device 200b presents user interface 146b to participant 123b. In an illustrative scenario, communication device 200b is in a marginal coverage area of network node 202 that is providing sufficient downlink transmission power. However, communication device 200b is not providing sufficient uplink transmission power. User interface 146b may present a local image stream 307 from image capturing device 130b that is not yet degraded during or after transmission. However, communication device 200b transmits degraded image stream 307' to the video communication session. Participant 123b receives an indication from user interface 146b of transmit degradation. Degradation can also occur with the audio stream that originates at microphone 132b of communication device 200b. Host communication device 200a (and other communication device 200c) receives and presents degraded image stream 307' from communication device 200b. Communication device 200e received degraded image stream 307' from communication device 200b. Controller 110 (FIG. 1A) of one of communication devices 200a, 200c, and 200e can determine that degraded image stream 307' has an unacceptable amount (below a preset or user/participant determined threshold value) of degradation. According to different embodiments, the determination can be based on analyzing degraded image stream 307' or by receiving manual user inputs from one or more of participants 123a and 123c.

According to a second aspect of the disclosure, communication device 200c presents user interface 146c to participant 123c. In the depicted scenario, communication device 200c was temporarily disconnected from and is reconnecting to the video communication session. During the interruption, participant 123c has missed a portion of the video communication session. Alternatively, communication device 200c was connected late and participant 123c thus missed a first portion of the video communication session. Aspects of the present disclosure are applicable to interruptions caused by system problems as well as caused by human choices. Once reconnected, user interface 146c of communication device 200c can provide image stream and audio stream previously distributed to the video communication session during the period in which the communication device 200c was not connected to and/or did not receive the missed portion.

According to a third aspect of the disclosure, communication device 200e is a network server than can be configured with software and data via management console 196 for supporting video communication sessions. Communication device 200e can be an implementation of communication device 100a of FIG. 1B. Communication device 200e can autonomously facilitate and manage certain functions of one or more concurrent video communication sessions such as handling log ins, distribution of image streams, audio streams, and data streams to communication devices 200a-200c, and dynamically buffering content for individualized playback as described further with regard to FIGS. 6, 9 and 10A-10B.

Figure 4:
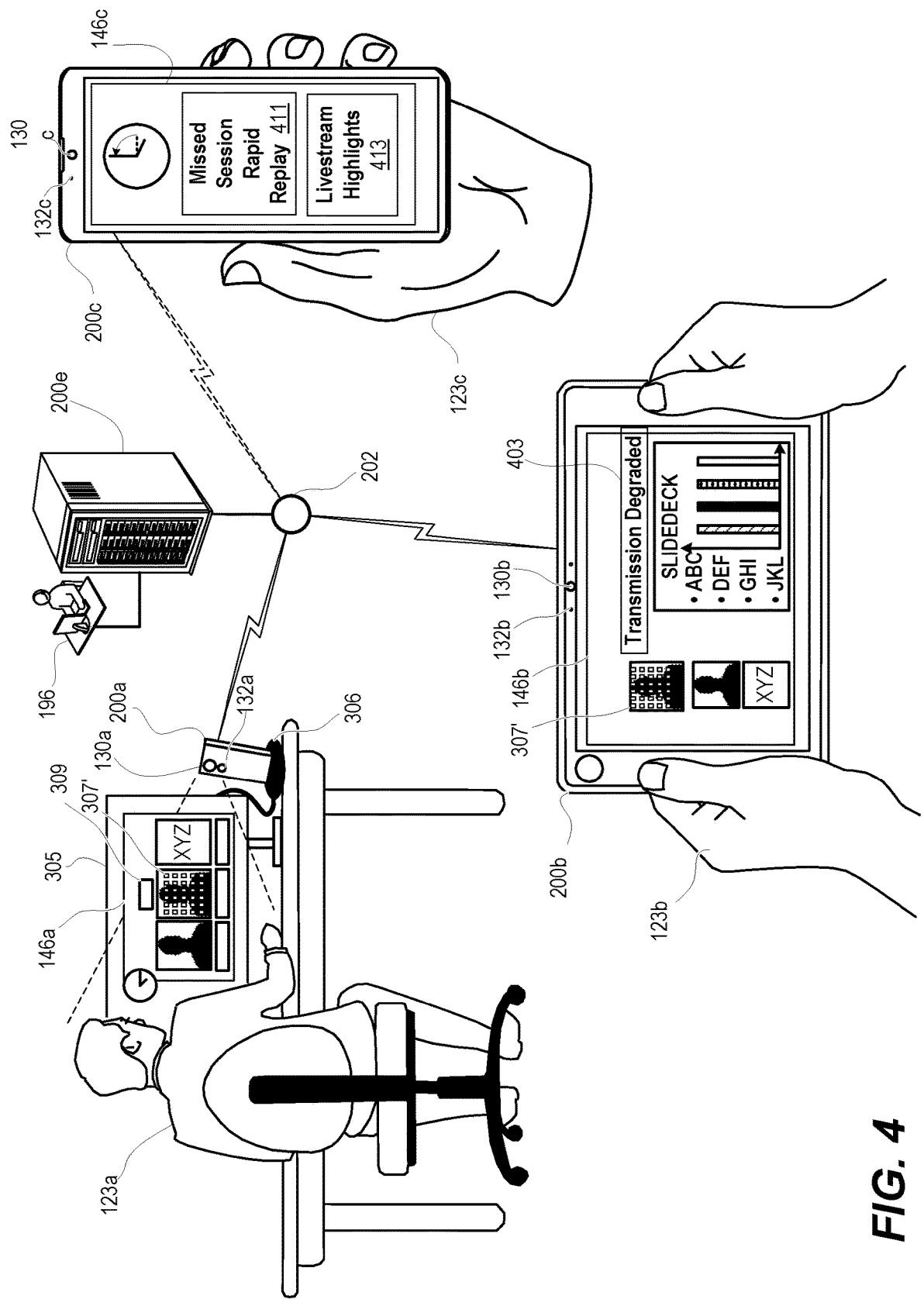
FIG. 4 depicts a communication network environment that includes host and participant communication devices that are receiving and autonomously responding to degraded audio/video transmissions within the video communication session, according to one or more embodiments.

FIG. 4 depicts a subsequent view of respective user interface 146a-146c of first, second, and third communication devices 200a-200c participating in a video communication session. Second communication device 200b has been alerted by either communication device 200a or 200e of degraded image stream 307'. As an example, a full duplex copy of degraded image stream 307' and degraded transmission alert 403 is presented on user interface 146b of communication device 200b. Controller 110 (FIG. 1A) of communication device 200b can autonomously mitigate the degraded transmission in response to at least one of degraded image stream 307' and degraded transmission alert 403. As an example, communication device 200b can search for an alternate network node or alternate communication access technology. The latter can include enabling Wi-Fi to enable switching from cellular wireless to Wi-Fi. The latter can include disabling Wi-Fi to force switching to cellular wireless. As another example, communication device 200b can select an alternate image stream that has a reduced data rate that can be successfully transmitted on an available uplink channel. Alternatively or in addition, participant 123b can mitigate the degraded transmission in response to at least one of degraded image stream 307' and degraded transmission alert 403. As an example, participant 123b can move communication device 200b away from structures or interference sources to improve an uplink communication channel. As another example, participant 123b can enable use of an alternate network node or alternate communication access technology such as by enabling use of roaming service on another carrier network as a non-subscriber.

Fifth communication device 200e autonomously supports the video communication session by selecting and recording/buffering a length of buffered video communication session. Participant 123c can consume this buffered length of the video communication session as a missed session rapid replay 411 that is received from fifth communication device 200e and presented on user interface 146c. To avoid unintelligible playing of two audio streams (buffered and live), one of the two can be closed captioned while the other is presented audibly. To mitigate unavailability to current progress of the video communication session, fifth communication device 200e can also support livestream highlights 413 that are concurrently presented on user interface 146c of third communication device 200c. As an example, livestream highlights 413 can include a real-time transcript of the discussion. As another example, livestream highlights 413 can include chat entries or instant messages by participants 200a-200b. As an example. livestream highlights 413 can provide information that indicates an urgent need for participant 123c to switch to live content of video communication session. Participant 123c can subsequently switch back to playback if desired.

FIG. 5 presents a flow diagram of method 500 for responding to a second communication device that is transmitting degraded audio, video, or data in a video communication session. In at least one embodiment, an electronic device such as communication device 100 (FIG. 1A) or communication device 100a (FIG. 1B), managed by controller 110, executes video conference application 114, to configure corresponding communication device 100 (FIG. 1A) or communication device 100a (FIG. 1B), to facilitate a video communication session with second electronic devices such as communication devices 144a-144b (FIG. 1A). In one or more embodiments, the electronic device is one of communication devices 200a-200e (FIG. 2) and the second electronic device are other ones of communication devices 200a-200d. The description of method 500, as well as method 600 discussed below respectively with regard to FIG. 6, are provided with general reference to the specific components illustrated within the preceding FIGS. 1A-1B and 2-4, and specific components referenced in methods 500 and 600 can be identical or similar to components of the same name used in describing preceding FIGS. 1A-1B and 2-4.

Method 500 includes receiving at least one of an audio stream and an image stream provided by at least one transmitting device of one or more second electronic devices during a video communication session (block 502). In one or more embodiments, method 500 includes communicating the at least one of the audio stream and the image stream from the at least one transmitting device to other ones of the one or more second electronic devices (block 504). As an example, an electronic device is a network server that facilitates the video communication session. As another example, electronic device is a peer to the one or more second electronic devices that are peer-to-peer sharing audio and video. In one or more embodiments, electronic device is not responsible for performing all of block 504, and the electronic device communicates with a network server that performs the distribution with the one or more second electronic devices. In one or more embodiments, method 500 includes communicating the audio stream and the image stream back to the particular one of the one or more second electronic devices to enable a participant using the particular one of the one or more second electronic devices to experience any degradation of one or more of the audio stream and the image stream provided by the particular one of the one or more second electronic devices (block 506). As an example, the full duplexing of transmitted content enables each transmitting device to monitor its own transmissions. In other embodiments, to avoid the communication overhead, full duplexing of transmitted content is selectively performed, such as when certain transmitting devices are detected as having a marginally supported transmission channel. Method 500 includes receiving reports from a particular one of the one or more second electronic devices that indicate that at least one of the audio stream and the image stream from the particular one of the one or more second electronic devices is degraded (block 508). Method 500 includes accumulating the reports and tracking an accumulated number of reports received about each of the one or more second electronic devices (block 510). Method 500 includes comparing the accumulated number to a count threshold (block 512). Method 500 includes determining whether the accumulated number of reports received for that particular electronic device exceeds the count threshold (decision block 514). Exceeding the count threshold indicates that at least one of the audio stream and the image stream from the particular one of the second electronic devices is degraded for the video communication session. In response to determining that the accumulated number of reports exceeds the count threshold, method 500 includes alerting the particular one of the one or more second electronic devices of the degraded state of the transmission (block 516). Then method 500 returns to block 502. The alert can be a defined message received and understood by the video conference application. The video conference application is executed by a controller of the particular one of the one or more second electronic devices.

In response to determining that the accumulated number of reports does not exceed (i.e., less than or equal to) the count threshold, method 500 includes monitoring one or more of the audio stream and the image stream received from the particular one of the one or more second electronic devices (block 518). Method 500 includes comparing transmission characteristics of each of the one or more of the audio stream and the image stream to a respective standard for a non-degraded level of transmission (block 520). Method 500 includes determining whether a number of differences in the transmission characteristics exceeds a transmission threshold (decision block 522). In response to determining that the number of differences exceeds the transmission threshold, method 500 returns to block 516. In response to determining that the number of differences does not exceed the transmission threshold, method 500 returns to block 502.

FIG. 6 presents a flow diagram of method 600 for distributing buffered content from an ongoing video communication session in response to detecting/identifying degraded network connectivity with a receiving device. Method 600 includes buffering at least portions of an ongoing video communication session in a dynamically accessible format (block 602). Method 600 includes determining whether a request is received for downloading a selected time interval (e.g., 30 seconds) of the buffered video communication session (decision block 604). In response to determining that a request is not received for the selected time interval of the buffered video communication session from the second particular one of the one or more second electronic devices, method 600 proceeds to decision block 616. In response to determining that a request is received for the selected time interval of the buffered video communication session from the second particular one of the one or more second electronic devices, method 600 includes determining the receiving data rate of the second particular one of the one or more second electronic devices (block 606). Method 600 includes creating a version of the buffered video communication session that comprises a data streaming rate that is less than the data rate (block 608). Method 600 includes communicating the version to the particular one of the one or more second electronic devices at a selected playback speed, selected from among more than one playback speed (block 610). As an example, the version can be an audiovisual file that can be played in an audiovisual player window. In one or more embodiments, the audiovisual file is time compressed by electronic device. In one or more embodiments, the audiovisual player window is capable of adjusting playback speed of the audiovisual file. In one or more embodiments, method 600 includes indicating to other second electronic devices the playback status of the particular one of the second electronic devices (block 612). By knowing that the particular participant may be distracted by the playback and not paying close attention to live content, other participants can contact the participant consuming the playback via a chat box or other channels to prompt the participant to join the video conference session in a live capacity.

Figure 9:
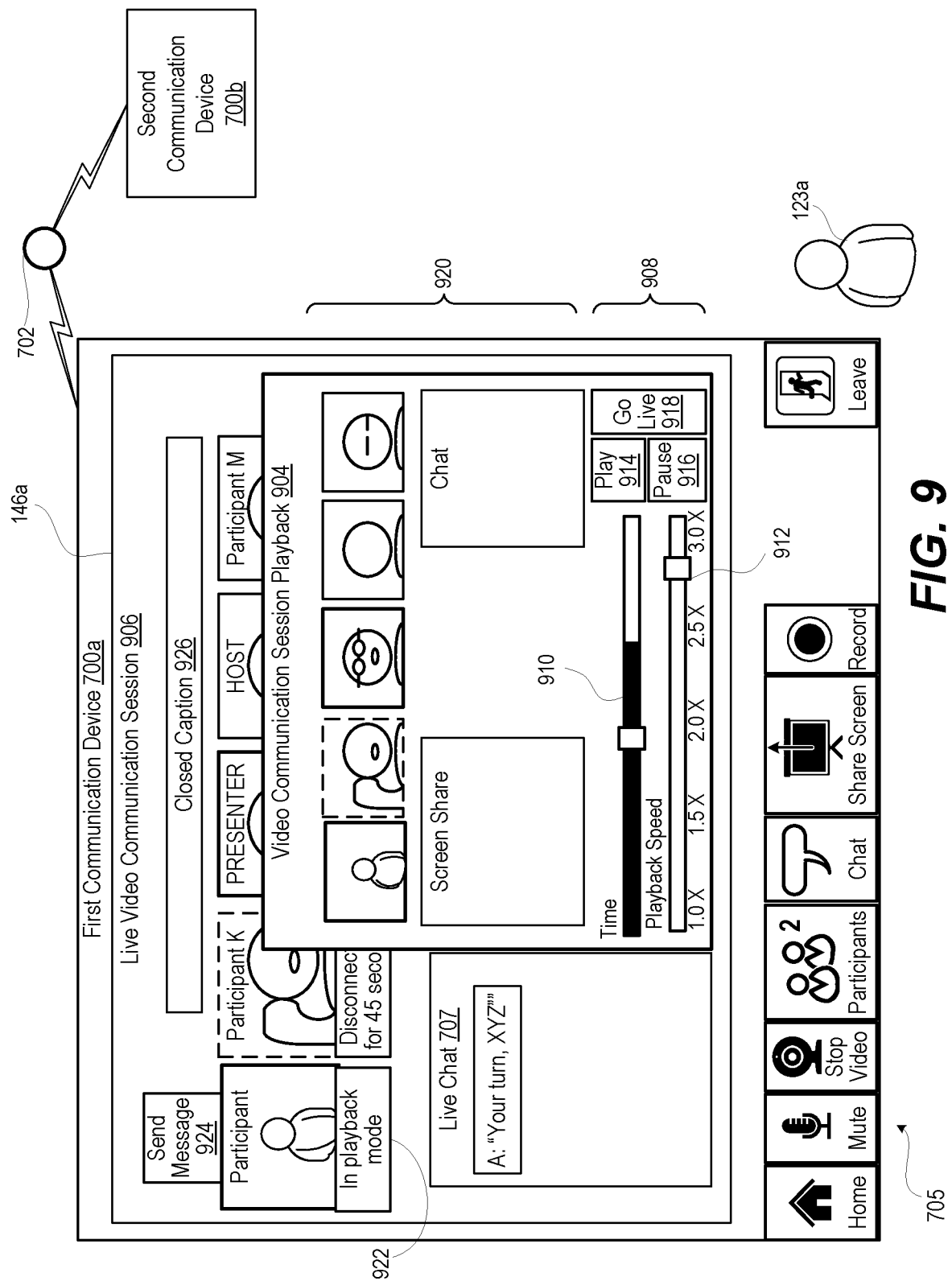
FIG. 9 depicts a user interface of a communication device that is presenting playback of a missed prior portion of an on-going video communication session, according to one or more embodiments.

Method 600 includes communicating highlights of a livestream version of the ongoing video communication session to the particular one of the one or more second electronic devices (block 614). As an example, spoken content can be transcribed. As another example, shared screen and video image of a presenting participant can both be displayed on a user interface of the particular one of the second electronic devices as well as a playback window. As an example, FIG. 9 depicts user interface 146*a* that presents both playback window 904 along with a portion of live video communication session window 906. Based on who is presenting, a local participant may choose to switch back to the live video communication session. As another example, small mobile displays may require toggling between buffered and live views to see more than closed captioning or live chat messages or instant messages. With reference to FIG. 6, then method 600 returns to block 602.

In response to determining that a request is not received in decision block 606, method 600 includes determining whether communication with a particular second electronic device is interrupted (decision block 616). As an example, electronic device can determine which participants are scheduled to join the video communication device, which second electronic devices have initiated connection, which second electronic devices are connected, and which second electronic devices are connected and communicating audio stream and/or image stream. During the connection process, the electronic device associates respective second communication devices with scheduled or unscheduled participants. According to aspects of the present disclosure, a participant that is scheduled to join but has not done so yet can be identified as being in an "interrupted state." A second communication device with associated participant can be identified as in the interrupted state during periods of time in which the connection is being established. The second communication device is also in the interrupted state while disconnected from the video communication session. In one or more embodiments, the electronic device can determine that the quality of the audio stream and/or image stream transmitted by a particular second electronic device indicate an interrupted state based on a presumption that the reception by the particular second electronic device is similarly degraded. In one or more embodiments, the particular second electronic device may have a sufficient communication channel to indicate to the video communication session that the particular second electronic device is in an interrupted state. In response to determining that communication with the particular second electronic device is not interrupted in decision block 616, method 600 returns to block 602. In response to determining that communication with the particular second electronic device is interrupted in decision block 616, method 600 includes determining the time interval during which the second particular one of the one or more second electronic devices did not receive the video communication session (block 618). Method 600 includes determining whether the particular one of one or more second communication devices is still in the interrupted state (decision block 620). In response to determining that the particular one of one or more second communication devices is still in the interrupted state, method 600 returns to block 602. In response to determining that the particular one of one or more second communication devices is not interrupted, method 600 includes soliciting a request from the particular second electronic device for an individualized playback of the selected time interval of the buffered video communication session corresponding to the interruption (block 622). The electronic device facilitates the playback by offering the particular length of the buffered video communication session but can expect the participant to "pull" the content by taking an action. In one or more embodiments, method 600 can be implemented differently, based on a presumption that the participant would want to automatically reconnect in playback mode until caught up or until choosing to switch to the live video communication session. The electronic device thus "pushes" the content.

Figure 7:
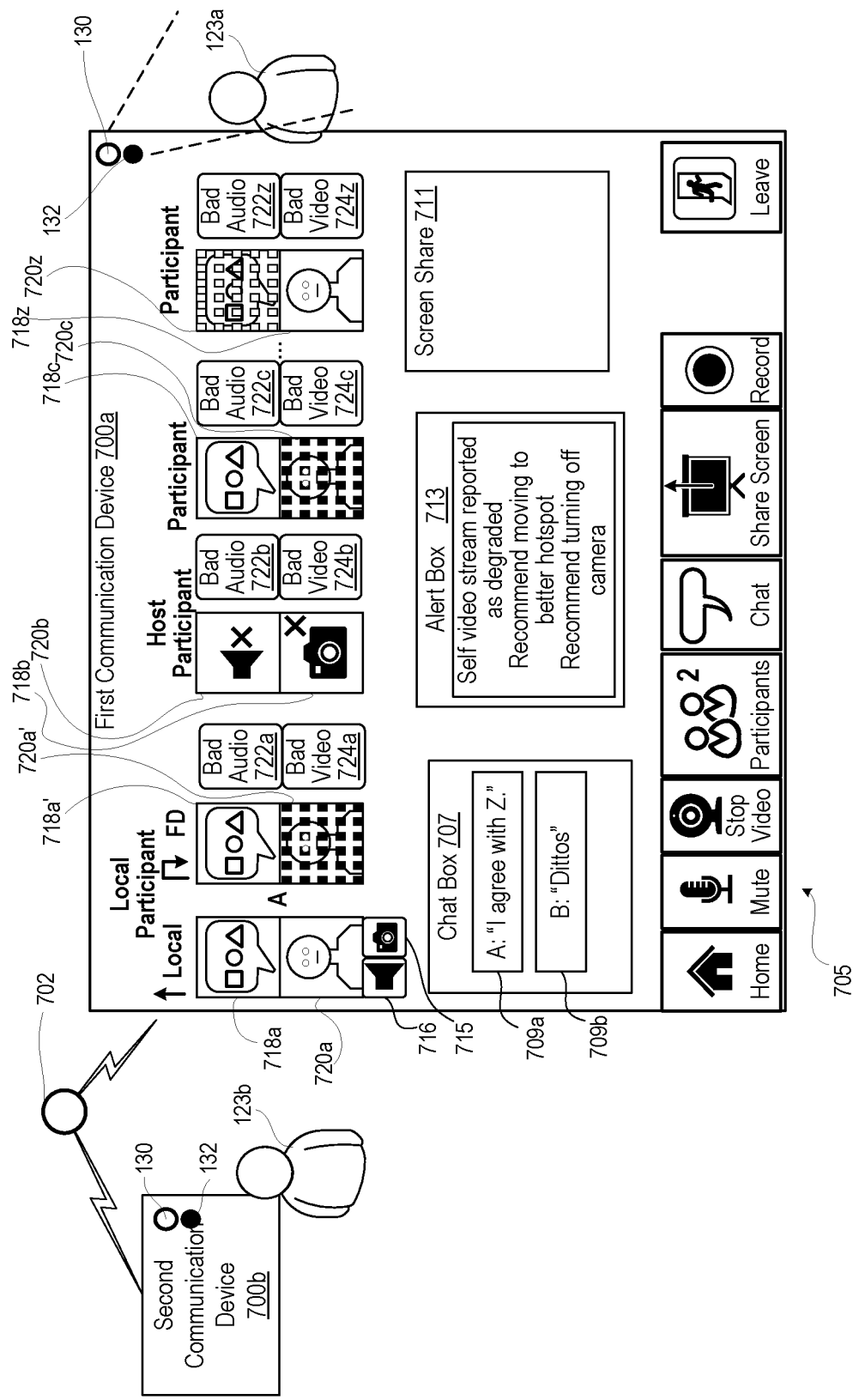
FIG. 7 depicts a user interface of a transmitting communication device that is autonomously responding to remotely reported degradation of transmissions, according to one or more embodiments.

FIGS. 7 and 8A-8C illustrate one aspect of the present disclosure in which electronic devices mitigate audio/video communication degradation of a local participant in a video communication session. The electronic device used by the local participant can be similar or identical to communication device 100 (FIG. 1A) or one of communication devices 200a-200d (FIG. 2). Second electronic devices that also connect to the video communication session can be similar or identical to second communication devices 144a-144b (FIG. 1A) or other ones of communication devices 200a-200d (FIG. 2). Communication device 100a (FIG. 1B) or communication device 200e (FIG. 2) can facilitate the video communication session and/or assist in mitigating audio/video communication degradation. FIG. 7 depicts user interface 146a of "transmitting" communication device 700a that is autonomously responding to remotely reported degradation of transmissions. Participant 123a uses communication device 700a and participant 123b uses second communication device 700b to participate in a video communication session. Each communication device 700a-700b can be an implementation of communication device 100 (FIG. 1A), or communication devices 200a-200e (FIG. 2) having similar or identical components. Each communication device 700a-700b can include or be in control of respective image capturing devices 130 and microphones 132 for producing image stream and audio stream that incorporate images and voices of participants 123a-123b. Each of communication devices 700a-700b can perform aspects of the present innovation and functionality as described herein. In particular, communication device 700a receives a report from second communication device 700b indicating that a transmission from communication device 700a is degraded. Communication device 700a autonomously responds to the report from communication device 700b to mitigate the degraded transmission. For clarity, communication device 700a and second communication device 700b are communicatively coupled via network 702. User interface 146a also supports user inputs indicating particular audio/video transmissions from additional second communication devices that are degraded. In response to the user inputs, communication device 700a reports to the corresponding additional second communication devices to prompt manual or automatic mitigation.

User interface 146a provides general video communication session controls 705 such as "Home", "Mute", "Stop Video", "Participants", "Chat", "Share Screen", "Record", and "Leave". A chat box 707 contains participant comments 709a-709b. Screen share box 711 can depict content from second communication device 700b. Alert box 713 informs participant 123a that second communication device 700b has determined that one or both of image stream and audio stream produced by image capturing devices 130 and microphones 132 of communication device 700a are degraded when received by second communication device 700b. Communication device 700a can autonomously respond to receiving an alert (displayed within alert box 713) by toggling respectively camera and microphone controls 715-716 to turn off one or both of image capturing devices 130 and microphones 132. In one or more embodiments, participant 123a can also manually toggle camera and microphone controls 715-716 to turn off the corresponding sensor/device. In one or more embodiments, participant 123a can view full duplex self-audio stream indication 718a' and self-video stream indication 720a'. If either or both 718a', 720a' is/are degraded, participant 123a can select bad audio control 722a or bad video control 724a to prompt communication device 700a to perform mitigation, such as compressing transmissions or seeking an alternate network path. In one or more embodiments, image stream indications 718b-718d and audio stream indications 720b, 720c, and 720z for one or more second communication devices 700b have corresponding bad audio controls 722b, 722c, and 722z and bad video controls 724b, 724c, and 724z. Activating one of bad audio controls 722b, 722c, and 722z and bad video controls 724b, 724c, and 724z causes communication device 700a to report either directly or indirectly to originating second communication device 700b.

Figure 8A:
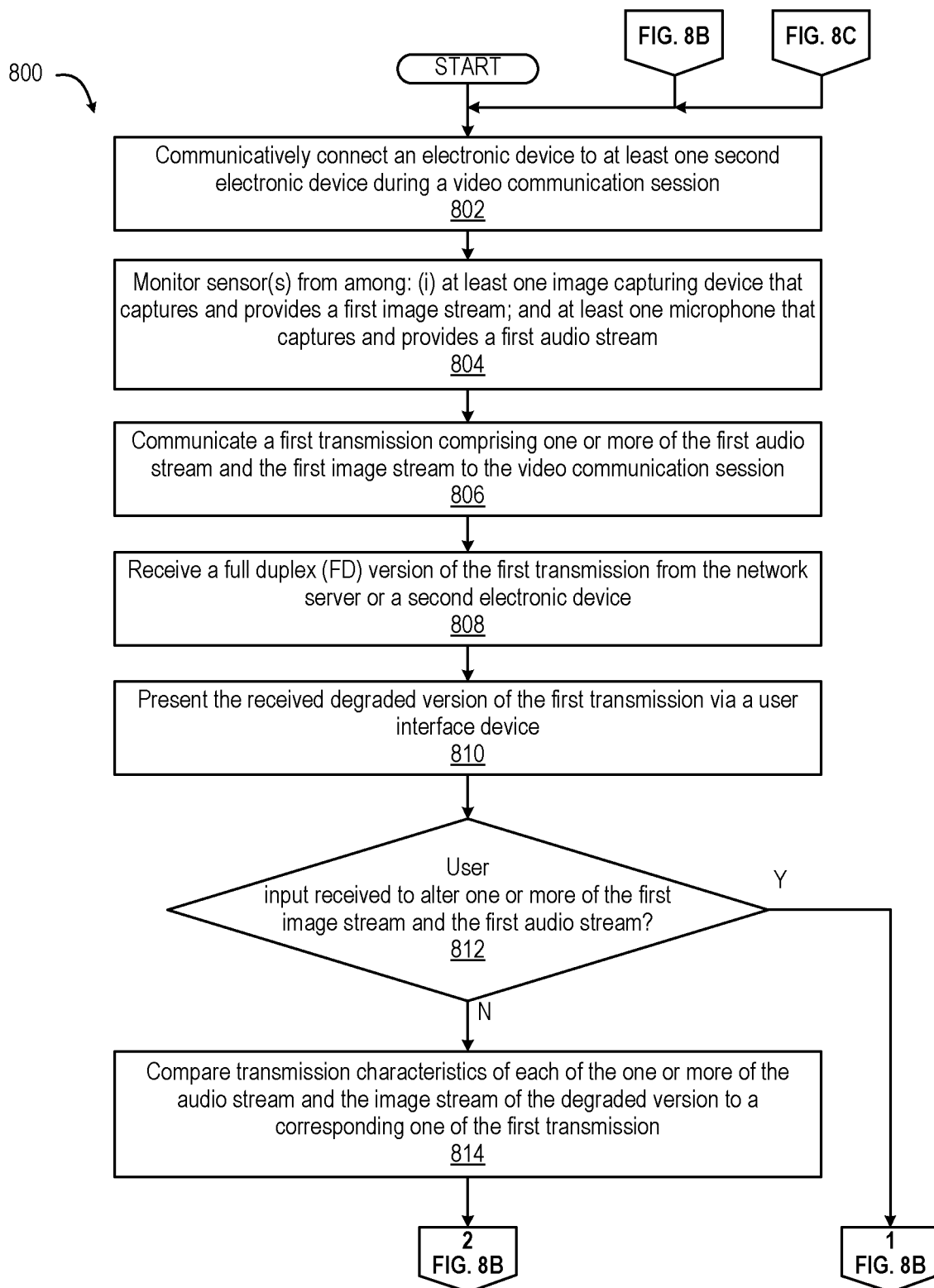
FIGS. 8A-8C (FIG. 8) present a flow diagram of a method for responding by a transmitting device to detected/identified degraded network connection to receiving device(s) in a video communication session, according to one or more embodiments.
Figure 8B:
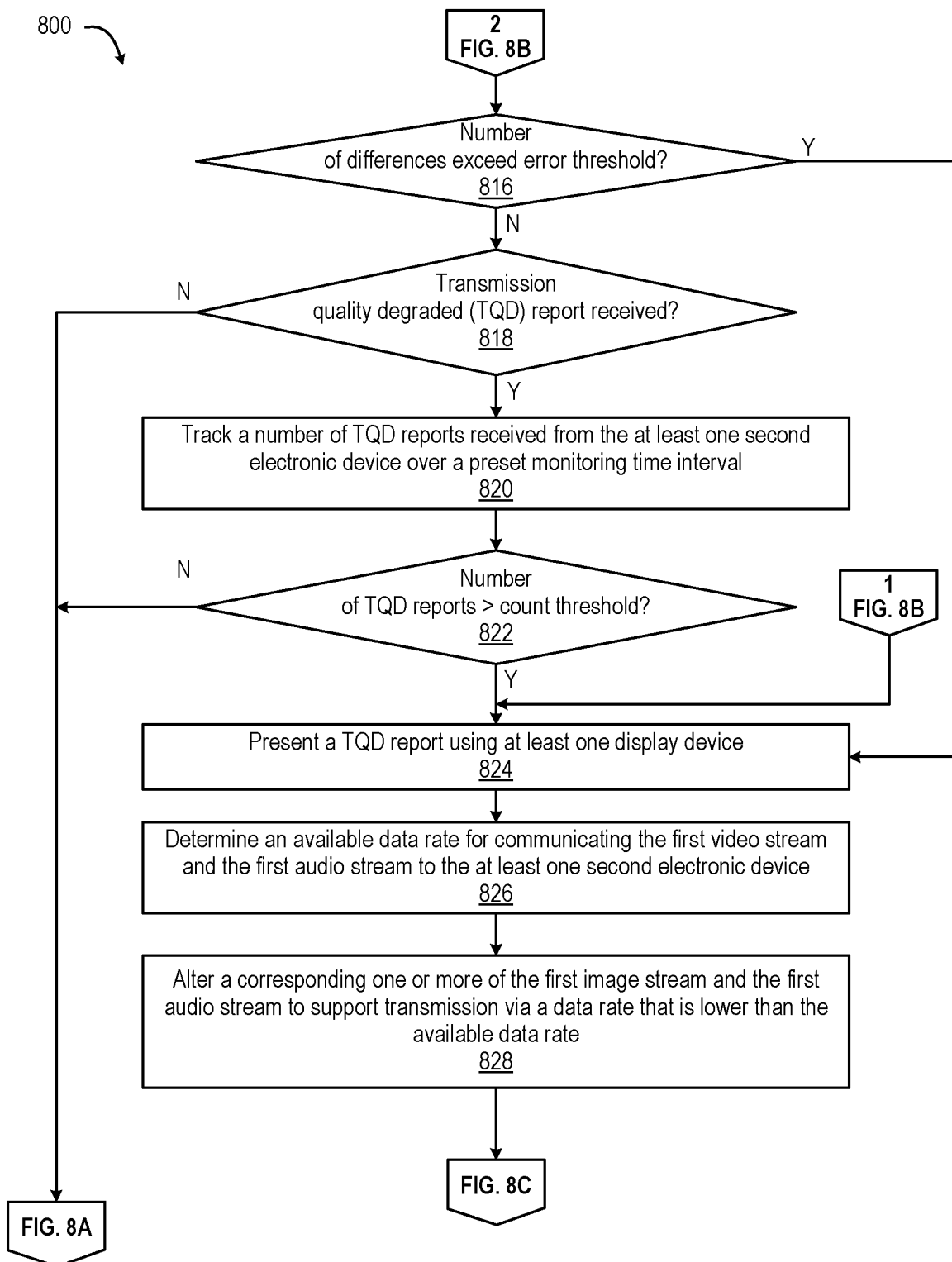
Figure 8C:
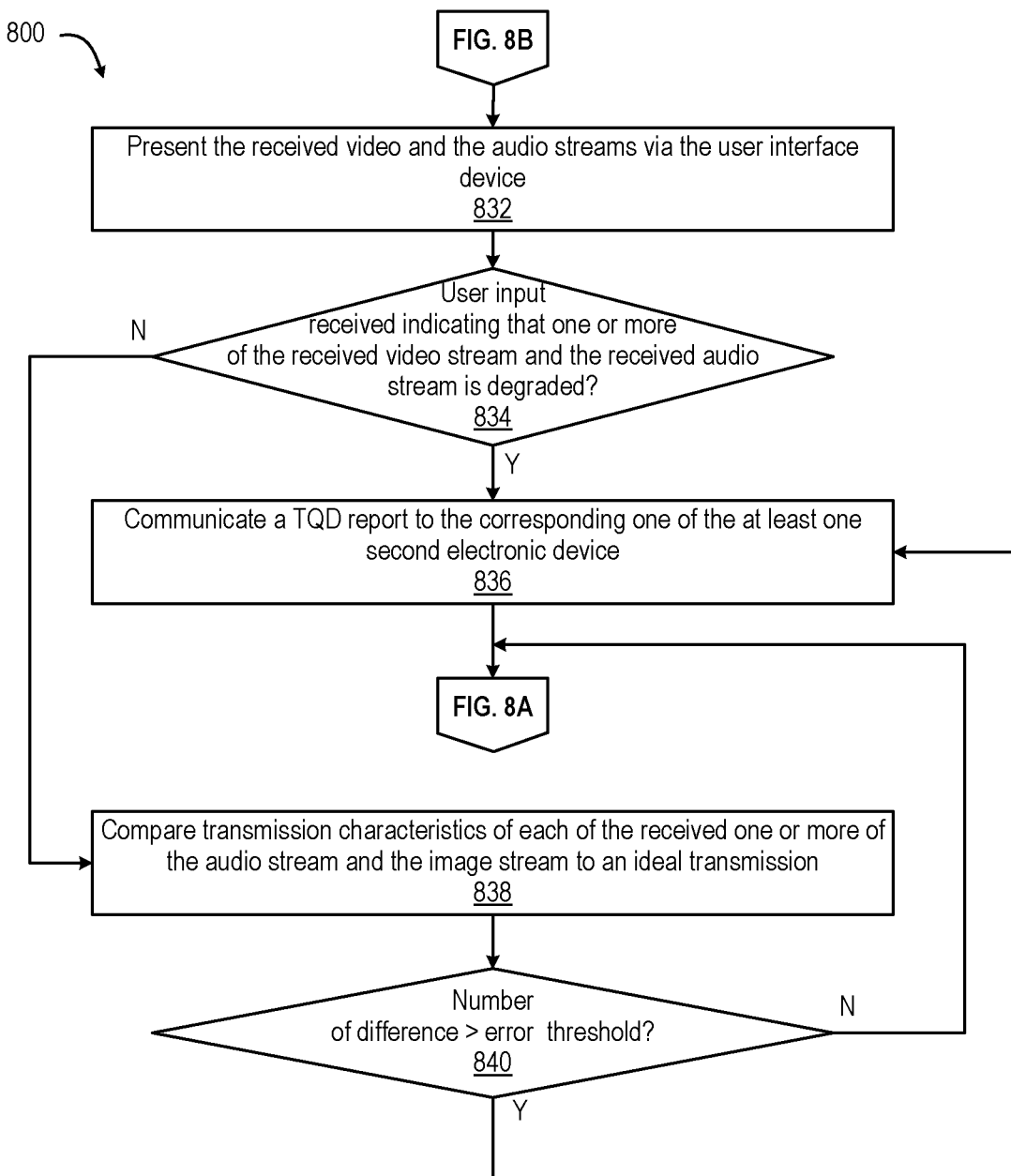

FIGS. 8A-8C (FIG. 8) present a flow diagram of method 800 for responding by a "transmitting" communication device to degraded network connectivity in a video communication session with "receiving" second communication device(s). In at least one embodiment, communication device 100, managed by controller 110, executes video conference application 114, configuring communication device 100 (FIG. 1A) or communication device 100a (FIG. 1B) to facilitate a video communication session. The description of method 800 is provided with general reference to the specific components illustrated within the preceding FIGS. 1-7, and specific components referenced in method 800 may be identical or similar to components of the same name used in describing preceding FIGS. 1-7.

With reference to FIG. 8A, method 800 includes communicatively connecting an electronic device to at least one second electronic device during a video communication session (block 802). In one or more embodiments, method 800 includes connecting to a network server during the video communication session. The network server can act as an intermediary device in connecting to the at least one second electronic device. The network server receives and redistributes a respective image and audio stream from each of the at least one second electronic device and can receive a degraded version of the first transmission from the electronic device. Method 800 includes monitoring, by a controller of the electronic device, one or more sensors from among: at least one image capturing device that captures and provides a first image stream; and at least one microphone that captures and provides a first audio stream (block 804). Method 800 includes communicating a first transmission comprising one or more of the first audio stream and the first image stream to the video communication session (block 806). In one or more embodiments, method 800 includes receiving a full duplex (FD) version of the first transmission from the network server or a second electronic device (block 808). The FD version of the first transmission can be sent as a routine procedure so that each participant can experience what the other participants are receiving. The FD version of the first transmission can also enable the transmitting device to autonomously determine whether the first transmission is degraded and to mitigate the degradation. In one or more embodiments, the FD version of the first transmission is sent as an intuitive alert when the network server or one or more second electronic devices determine that the first transmission is degraded. Method 800 includes presenting the received degraded version of the first transmission via a window presented within a user interface device (block 810). The presentation enables a user of the electronic device to experience the degraded version that is being received by the two or more second electronic devices. Method 800 includes determining whether a user input is received to alter one or more of the first image and audio stream (decision block 812). In response to determining that a user input is received to alter one or more of the first image stream and the first audio stream, method 800 proceeds to block 824 (FIG. 8B). In response to determining that a user input is not received to alter one or more of the first image and audio stream, method 800 includes comparing transmission characteristics of each of the one or more of the audio stream and the image stream of the degraded version to a corresponding characteristic of the first transmission (block 814). Then method 800 proceeds to block 816 (FIG. 8B).

With reference to FIG. 8B, method 800 includes determining whether a number of differences between the degraded version and the first transmission exceeds an error threshold (decision block 816). In response to determining that the number of differences between the degraded version and the first transmission exceeds the error threshold, method 800 proceeds to block 824. In response to the number of differences between the degraded version and the first transmission not exceeding the error threshold, method 800 includes determining whether a "transmission quality degraded" (TQD) report is received from at least one of the at least one second electronic devices (decision block 818). In response to determining that no TQD report is received, method 800 returns to block 802 (FIG. 8A). In response to determining that a TQD report is received, method 800 includes tracking a number of TQD reports received from the at least one second electronic device over a preset monitoring time interval (block 820).

Method 800 includes determining whether the number of TQD reports exceeds a count threshold over the preset monitoring time interval (decision block 822). In response to determining that the number of TQD reports does not exceed the count threshold over the preset monitoring time interval, method 800 returns to block 802 (FIG. 8A). In response to determining that the number of TQD reports exceeds the count threshold over the preset monitoring time interval or that the monitoring time interval has elapsed, method 800 includes presenting a TQD report using at least one display device (block 824). In one or more embodiments, the count threshold is 0 such that receipt of any TQD reports triggers a response. In one or more embodiments, the count threshold is 1 or more. In one or more embodiments, the notification identifies that one or more of the first audio stream and the first image stream received by the at least one second electronic device is degraded, enabling a user of the electronic device to take steps (e.g., moving the electronic device) to improve a communication channel.

In one or more embodiments, method 800 includes determining an available data rate for communicating the first video stream and the first audio stream to the at least one second electronic device (block 826). Method 800 includes altering a corresponding one or more of the first image stream and the first audio stream to support transmission via a data rate that is lower than the available data rate (block 828). As an example, method 800 includes turning off the image stream. As another example, method 800 includes transcribing the first audio stream into text for communicating text in a chat portion of the video communication session. Then method 800 proceeds to block 832 (FIG. 8C).

With reference to FIG. 8C, method 800 includes presenting the received video stream and the audio stream via the user interface device (block 832). Method 800 includes determining whether a local user input is received indicating that one or more of the received video stream and audio stream is degraded (decision block 834). In response to determining that a user input is received indicating that one of a particular one of the received video stream and audio stream is degraded, method 800 includes generating and communicating a TQD report to the corresponding one of the at least one second electronic device (block 836). Then method 800 returns to block 802 (FIG. 8A). In response to determining that a user input is not received indicating that one of a particular one of the received video stream and audio stream is degraded in decision block 834, method 800 includes comparing transmission characteristics of each of the received one or more of the audio stream and the image stream to a predetermined transmission level or standard (block 838). Method 800 includes determining whether a number of differences from each of the received one or more of the audio stream and the image stream compared to the predetermined transmission level exceeds an error threshold (decision block 840). In response to determining that number of differences from each of the received one or more of the audio stream and the image stream to an ideal transmission does not exceed (i.e., is less than or equal to) the error threshold, method 800 returns to block 802 (FIG. 8A). In response to determining that number of differences from the received one or more of the audio stream and the image stream to the predetermined transmission level exceeds the error threshold, method 800 returns to block 836.

FIG. 9 depicts user interface 146*a* of first communication device 700*a* that is presenting playback window 904 along with a portion of live video communication session window 906. Participant 123*a* can catch up on a missed portion of an on-going video communication session after joining late, being called away, or after reconnecting due to a technical interruption. Second communication device 700*b* can determine what portion of video communication session is missed by first communication device 700*a* and automatically offer up the particular segment. In one or more embodiments, second communication device 700*b* has access to network information including the connection status of other communication devices such as first communication device 700*a*. In one or more embodiments, other communication devices such as first communication device 700*a* report the connection information to second communication device 700*b*. Participant 123*a* can also specify a particular part of the buffered video communication session that is of interest. In an example, participant 123*a* may choose to repeat a portion of particular interest to participant 123*a* or a portion during which participant 123*a* was distracted. Video communication session playback window 904 can have customizable controls 908 such as time slider bar 910 to manually select a length of the buffered content to playback and a playback speed slider bar 912. Other controls 908 can include play button 914, pause button 916, and go live button 918. Video communication session playback window 904 also presents buffered display and audio content 920. Live video communication session window 906 may include playback indications 922 that inform local participant 123*a* which remote participants are consuming playback content and provide message control 924 to contact particular remote participants. Closed caption box 926 can be provided of the live video conference session for occasional reference while the buffered audio is being listened to. In one or more embodiments, closed caption box 926 can present the buffered content while the live audio is presented.

Figure 10A:
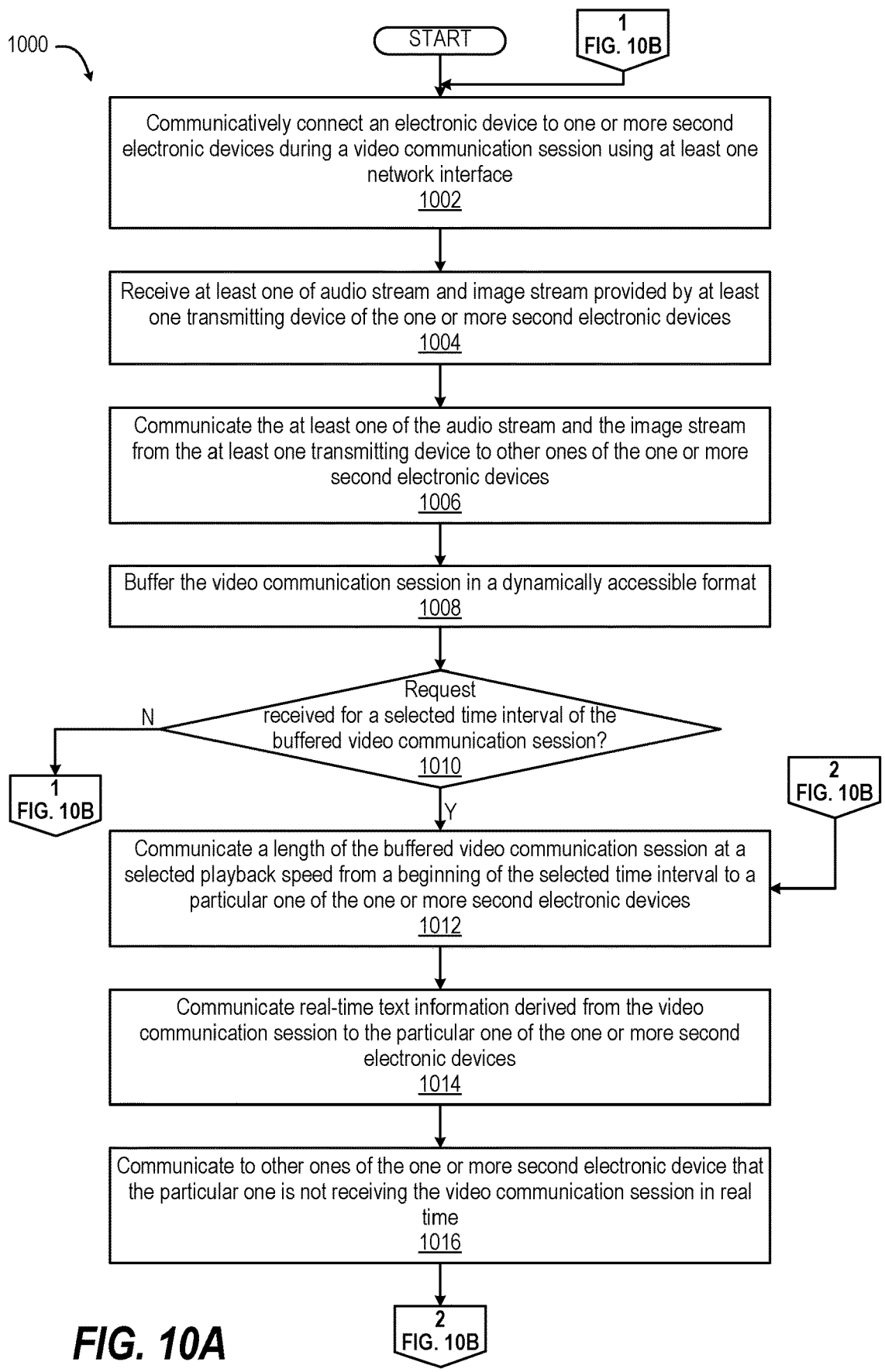
FIGS. 10A-10B (FIG. 10) present a flow diagram of a method for presenting buffered content from an ongoing video communication session, according to one or more embodiments.
Figure 10B:
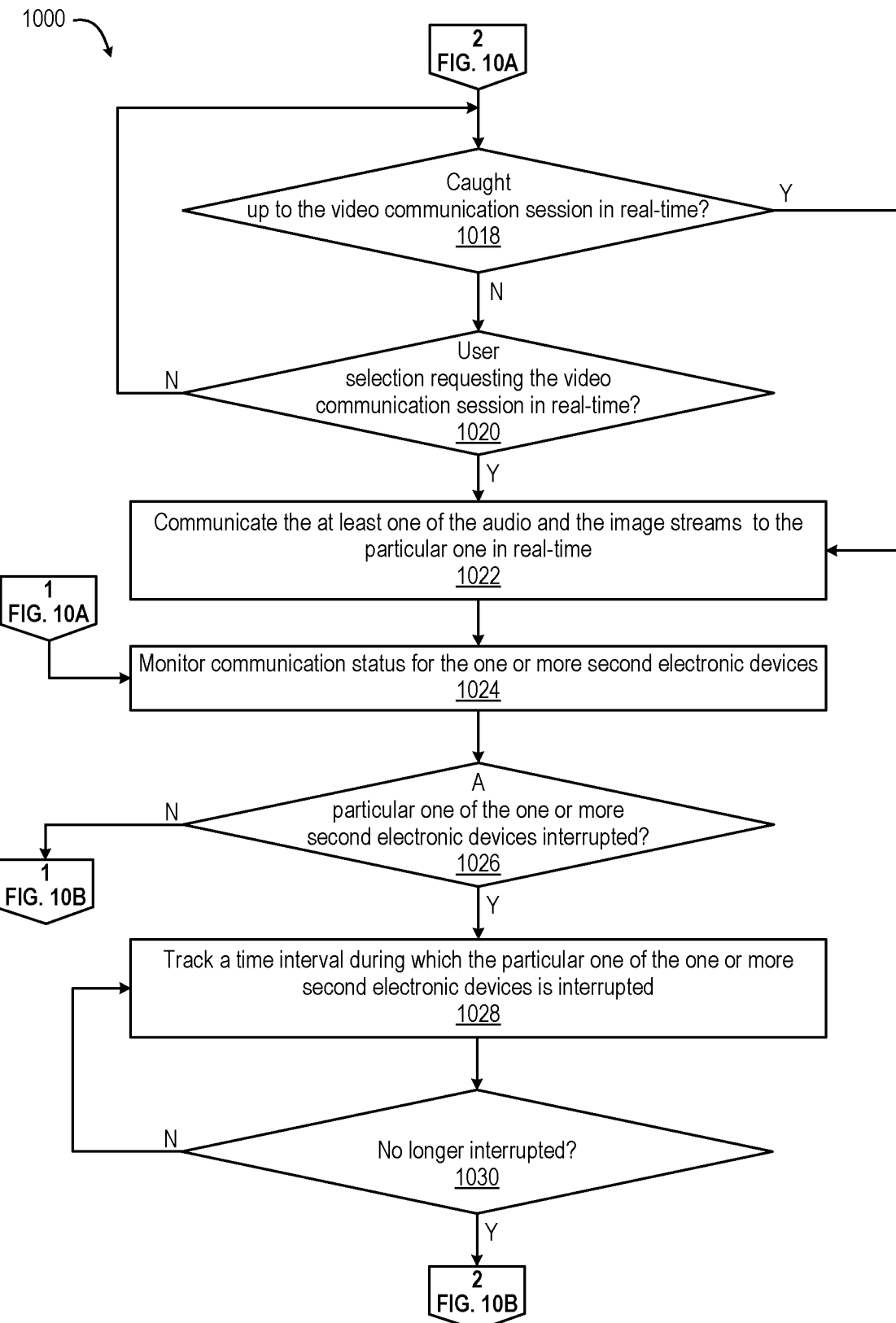

FIGS. 10A-10B (FIG. 10) present a flow diagram of method 1000 for presenting buffered content from an ongoing video communication session. In at least one embodiment, communication device 100, managed by controller 110, executes video conference application 114, configuring communication device 100 (FIG. 1A) to facilitate a video communication session. The description of method 1000 is provided with general reference to the specific components illustrated within the preceding FIGS. 1-8 and 9, and specific components referenced in method 1000 may be identical or similar to components of the same name used in describing preceding FIGS. 1-8 and 9.

With reference to FIG. 10A, method 1000 includes communicatively connecting an electronic device to one or more second electronic devices during a video communication session using at least one network interface (block 1002). Method 1000 includes receiving at least one of audio stream and image stream provided by at least one transmitting device of the one or more second electronic devices during the video communication session (block 1004). Method 1000 includes communicating the at least one of the audio stream and the image stream from the at least one transmitting device to other ones of the one or more second electronic devices (block 1006). Method 1000 includes buffering the video communication session in a dynamically accessible format (block 1008). Method 1000 includes determining whether a request is received for a selected time interval of the buffered video communication session from a particular one of the one or more second electronic devices (decision block 1010). In response to determining that the request is not received for the selected time interval of the buffered video communication session from a particular one of the one or more second electronic devices, method 1000 proceeds to block 1024 (FIG. 10B). In response to determining that the request is received for the selected time interval of the buffered video communication session from a particular one of the one or more second electronic devices, method 1000 includes, during the video communication session, communicating, to the particular second electronic device, a length of the buffered video communication session at a selected playback speed from a beginning of the selected time interval (block 1012). Method 1000 includes communicating real-time text information derived from the video communication session to the particular second electronic device that is presenting buffered video communication session (block 1014). The real time text information is transmitted concurrently with the buffered video communication session. Method 1000 includes communicating to other ones of the one or more second electronic device that are presenting real-time video communication session information that the particular one of the one or more second electronic devices is not receiving, or may be distracted from experiencing, the video communication session in real time (block 1016). Method 1000 proceeds to decision block 1018 (FIG. 10B).

With reference to FIG. 10B, method 1000 includes determining whether the presentation of the buffered video communication session by the particular one of the one or more second electronic device has caught up to the video communication session in real-time (decision block 1018). In response to determining that the presentation of the buffered video communication session by the particular one of the one or more second electronic device has caught up to the video communication session in real-time, method 1000 proceeds to block 1022. In response to determining that the presentation of the buffered video communication session by the particular one of the one or more second electronic device has not caught up to the video communication session in real-time, method 1000 includes determining whether a user selection is received that requests the video communication session in real-time from the particular one of the one or more second electronic devices (decision block 1020). In response to determining that the user selection requesting the video communication session in real-time is not received from the particular one of the one or more second electronic devices, method 1000 returns to decision block 1018. In response to determining that the user selection is received from the particular one of the one or more second electronic devices requesting the video communication session in real-time, method 1000 includes communicating the at least one of the audio stream and the image stream from the at least one transmitting device to the particular one of the one or more second electronic devices in real-time (block 1022).

After block 1022 or in response to determining that the request is not received in decision block 1010, method 1000 includes monitoring communication status for the one or more second electronic devices (block 1024). Method 1000 includes determining whether a particular one of the one or more second electronic devices is in an interrupted state, which includes being one of disconnected from the video communication session or receiving degraded transmission of the video communication session (decision block 1026). In response to determining that the particular one of the one or more second electronic devices is not in the interrupted state, method 1000 returns to block 1002 (FIG. 10A). In response to determining that the particular one of the one or more second electronic devices is in the interrupted state, method 1000 includes tracking a time interval during which the particular one of the one or more second electronic devices is interrupted (block 1028). Method 1000 includes determining whether the particular second electronic device is no longer in the interrupted state (decision block 1030). In response to determining that the particular second electronic device is no longer in the interrupted state (i.e., "Yes" in decision block 1030), method 1000 returns to block 1012 (FIG. 10A). In response to determining that the particular second electronic device continues to be in the interrupted state (i.e., "No" in decision block 1030), method 1000 returns to block 1028.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
    one or more sensors from among: (i) at least one image capturing device that captures and provides a first image stream; and at least one microphone that captures and provides a first audio stream;
    at least one of a display device and an audio output device operating as a user interface device;
    at least one network interface that communicatively connects the electronic device to at least one second electronic device via a video communication session;
    a controller communicatively coupled to the one or more sensors, the user interface device, and the at least one network interface, and which controls the electronic device to:
        communicate a first transmission comprising one or more of the first audio stream and the first image stream to the video communication session;
        receive, from one of a network server and a second electronic device among the at least one second electronic device, a degraded version of the first transmission;
        present the received degraded version of the first transmission via the user interface device to enable a user of the electronic device to experience the degraded version that is being received by the at least one second electronic device; and
        in response to receiving an indication that one or more of the first image stream and the first audio stream within the first transmission is degraded, perform at least one of (i) presenting a "transmission quality degraded" (TQD) report at the at least one display device; and (ii) mitigating the degradation of the first transmission by:
            altering a corresponding one or more of the first image stream and the first audio stream to support transmission via a lower data rate; and
            communicating the altered one or more of the first image stream and the first audio stream to the video communication session.

2. The electronic device of claim 1, wherein the controller presents a notification via the user interface device identifying that one or more of the first audio stream and the first image stream received by the at least one second electronic device is degraded.

3. The electronic device of claim 1, wherein the controller determines that one or more of the first image stream and the first audio stream is degraded in response to receiving a "transmission quality degraded" (TQD) report from at least one of the at least one second electronic devices.

4. The electronic device of claim 3, wherein the controller:
    tracks a number of TQD reports received from the at least one second electronic device over a preset monitoring time interval; and
    determines that the one or more of the first image stream and the first audio stream is degraded in response to the number of TQD reports exceeding a count threshold over the preset monitoring time interval.

5. The electronic device of claim 1, wherein:
    the at least one network interface connects to the network server during the video communication session, the network server receiving and redistributing a respective image and audio stream from each of the at least one second electronic device and receiving a degraded version of the first transmission from the electronic device; and the controller:
receives, using the at least one network interface, the degraded version of the first transmission from the network server; and determines that the one or more of the first image stream and the first audio stream is degraded in response to a user input to the at least one user interface device to alter the corresponding one or more of the first image stream and the first audio stream to the received version.

6. The electronic device of claim 1, wherein the controller:
receives, using the at least one network interface, the degraded version of the first transmission from the at least one second electronic device;
compares transmission characteristics of each of the one or more of the audio stream and the image stream of the degraded version to a corresponding one of the first transmission; and
determines whether the degraded version of one or more of the audio stream and the image stream is a degraded transmission in response to a number of differences between the degraded version and the first transmission exceeding an error threshold.

7. The electronic device of claim 1, wherein the controller alters the first transmission by: transcribing the first audio stream into text; and communicating the text in a chat portion of the video communication session.

8. The electronic device of claim 1, wherein the controller:
determines an available data rate for communicating the first image stream and the first audio stream via the at least one network interface; and
alters the first transmission by:
creating a version of the audio stream and the image stream that has a data streaming rate that is less than the available data rate; and
communicates the version to the at least one second electronic device using the data streaming rate.

9. The electronic device of claim 1, wherein the controller:
receives one or more of the image stream and audio stream provided by the at least one second electronic devices;
presents the received one or more of the image stream and the audio stream via the user interface device; and
in response to determining that a particular one of the image stream and the audio stream from a particular one of the at least one second electronic device is degraded, communicates a "transmission quality degraded" TQD report to the particular one of the at least one second electronic device.

10. A method comprising:
monitoring one or more sensors from among: (i) at least one image capturing device that captures and provides a first image stream; and (ii) at least one microphone that captures and provides a first audio stream;
communicatively connecting an electronic device to at least one second electronic device via a video communication session;
communicating a first transmission comprising one or more of the first audio stream and the first image stream to the video communication session;

receiving the degraded version of the first transmission from one of a network server and a second electronic device of the at least one second electronic device;
presenting the received degraded version of the first transmission via a user interface device to enable a user of the electronic device to experience the degraded version that is being received by the at least one second electronic devices; and
in response to receiving an indication that one or more of the first image stream and the first audio stream within the first transmission is degraded, performing at least one of (i) presenting a transmission quality degraded" (TQD) report using at least one display device; and (ii) mitigating the degradation of the first transmission by:
altering a corresponding one or more of the first image stream and the first audio stream to support transmission via a lower data rate; and
communicating the altered one or more of the first image stream and the first audio stream to the video communication session.

11. The method of claim 10, further comprising presenting a notification via the user interface device identifying that one or more of the first audio stream and the first image stream received by the at least one second electronic device is degraded.

12. The method of claim 10, wherein determining that one or more of the first image stream and the first audio stream is degraded is in response to receiving a "transmission quality degraded" (TQD) report from at least one of the at least one second electronic devices.

13. The method of claim 12, further comprising:
tracking a number of TQD reports received from the at least one second electronic device over a preset monitoring time interval; and
determining that the one or more of the first image stream and the first audio stream is degraded in response to the number of TQD reports exceeding a count threshold over the preset monitoring time interval.

14. The method of claim 10, further comprising:
connecting to the network server during the video communication session, the network server receiving and redistributing a respective image and audio stream from each of the at least one second electronic device and receiving a degraded version of the first transmission from the electronic device;
receiving the degraded version of the first transmission from the network server; and
determining that the one or more of the first image stream and the first audio stream is degraded in response to a user input to the at least one user interface device to alter the corresponding one or more of the first image stream and the first audio stream to the received version.

15. The method of claim 10, further comprising:
receiving the degraded version of the first transmission from the at least one second electronic device;
comparing transmission characteristics of each of the one or more of the audio stream and the image stream of the degraded version to a corresponding one of the first transmission; and
determining whether the degraded version of one or more of the audio stream and the image stream is a degraded transmission in response to a number of differences between the degraded version and the first transmission exceeding an error threshold.

16. The method of claim 10, wherein altering the first transmission comprises: transcribing the first audio stream into text; and communicating the text in a chat portion of the video communication session.

17. The method of claim 10, further comprising:
determining an available data rate for communicating the first stream and the first audio stream to the at least one second electronic device; and
altering the first transmission by:
creating a version of the audio stream and the image stream that has a data streaming rate that is less than the available data rate; and
communicating the version to the at least one second electronic device using the data streaming rate.

18. The method of claim 10, further comprising:
receiving one or more of the image stream and audio stream provided by the at least one second electronic devices;
presenting the received one or more of the image stream and the audio stream via the user interface device; and
in response to determining that a particular one of the image stream and the audio stream from a particular one of the at least one second electronic device is degraded, communicating a "transmission quality degraded" TQD report to the particular one of the at least one second electronic device.

19. A computer program product comprising:
a non-transitory computer readable storage device; and
program code on the non-transitory computer readable storage device that when executed by a processor associated with an electronic device, the program code enables the electronic device to provide functionality of:
monitoring one or more sensors from among: (i) at least one image capturing device that captures and provides a first image stream; and at least one microphone that captures and provides a first audio stream;
communicatively connecting an electronic device to at least one second electronic device via a video communication session;
communicating a first transmission comprising one or more of the first audio stream and the first image stream to the video communication session;
receiving the degraded version of the first transmission from one of a network server and a second electronic device of the at least one second electronic device;
presenting the received degraded version of the first transmission via a user interface device to enable a user of the electronic device to experience the degraded version that is being received by the at least one second electronic devices; and
in response to receiving an indication that one or more of the first image stream and the first audio stream within the first transmission is degraded, performing at least one of (i) presenting a transmission quality degraded" (TQD) report using at least one display device; and (ii) mitigating the degradation of the first transmission by:
altering a corresponding one or more of the first image stream and the first audio stream to support transmission via a lower data rate; and
communicating the altered one or more of the first image stream and the first audio stream to the video communication session.

20. The computer program product of claim 19, wherein the program code enables the electronic device to provide the functionality of:
receiving the degraded version of the first transmission from the at least one second electronic device;
comparing transmission characteristics of each of the one or more of the audio stream and the image stream of the degraded version to a corresponding one of the first transmission; and
determining whether the degraded version of one or more of the audio stream and the image stream is a degraded transmission in response to a number of differences between the degraded version and the first transmission exceeding an error threshold.

* * * * *